United States Patent
Gupta et al.

(10) Patent No.: US 10,168,953 B1
(45) Date of Patent: Jan. 1, 2019

(54) DYNAMIC SCHEDULING OF DISTRIBUTED STORAGE MANAGEMENT TASKS USING PREDICTED SYSTEM CHARACTERISTICS

(71) Applicant: Nutanix, Inc., San Jose, CA (US)

(72) Inventors: Karan Gupta, San Jose, CA (US); Varun Kumar Arora, Mountain View, CA (US); Himanshu Shukla, San Jose, CA (US); Bharath Kumar Beedu, Santa Clara, CA (US); Abhinay Nagpal, San Jose, CA (US)

(73) Assignee: Nutanix, Inc., San Jose, CA (US)

( * ) Notice: Subject to any disclaimer, the term of this patent is extended or adjusted under 35 U.S.C. 154(b) by 121 days.

(21) Appl. No.: 15/160,246

(22) Filed: May 20, 2016

(51) Int. Cl.
  *G06F 3/06* (2006.01)
  *G06N 7/00* (2006.01)

(52) U.S. Cl.
  CPC .......... *G06F 3/0659* (2013.01); *G06F 3/0604* (2013.01); *G06F 3/067* (2013.01); *G06N 7/005* (2013.01)

(58) Field of Classification Search
  CPC ...... G06F 3/0604; G06F 3/061; G06F 3/0638; G06F 3/067; G06N 7/005; G06N 7/023
  See application file for complete search history.

(56) References Cited

U.S. PATENT DOCUMENTS

| | | | |
|---|---|---|---|
| 7,953,843 B2 | 5/2011 | Cherkasova | |
| 8,060,599 B2 | 11/2011 | Cherkasova et al. | |
| 8,104,041 B2 | 1/2012 | Belady et al. | |
| 8,291,411 B2 | 10/2012 | Beaty et al. | |
| 8,326,970 B2 | 12/2012 | Cherkasova et al. | |
| 8,549,518 B1 | 10/2013 | Aron et al. | |
| 8,601,473 B1 | 12/2013 | Aron et al. | |
| 8,626,902 B2 | 1/2014 | Singh et al. | |
| 8,850,130 B1 | 9/2014 | Aron et al. | |
| 8,863,124 B1 | 10/2014 | Aron | |
| 8,997,097 B1 | 3/2015 | Aron et al. | |
| 9,015,122 B2 | 4/2015 | Harrison et al. | |

(Continued)

OTHER PUBLICATIONS

Nagpal et al., "Stay-Fit: Seasonal Time series Analysis and Forecasting using Tournament Selection", 3 pages; Nutanix, Inc., San Jose, CA. USA.

(Continued)

*Primary Examiner* — Hal Schnee
(74) *Attorney, Agent, or Firm* — Vista IP Law Group, LLP

(57) ABSTRACT

Systems and methods for scheduling storage management tasks over predicted user tasks in a distributed storage system. A method commences upon receiving a set of historical stimulus records that characterize management tasks that are run in the storage system. A corresponding set of historical response records comprising system metrics associated with execution of the system tasks is also received. A learning model is formed from the stimulus records and the response records and formatted to be used as a predictor. A set of forecasted user tasks is input as new stimulus records to the predictor to determine a set of forecasted system metrics that would result from running the forecasted user tasks. Management tasks are selected so as not to impact the forecasted user tasks. Management tasks can be selected based on non-contentions resource usage between historical management task resource usage and predictions of resource usage by the user tasks.

20 Claims, 13 Drawing Sheets

(56) References Cited

U.S. PATENT DOCUMENTS

| | | |
|---|---|---|
| 9,032,077 B1 | 5/2015 | Klein et al. |
| 9,052,936 B1 | 6/2015 | Aron et al. |
| 9,083,581 B1 | 7/2015 | Addepalli et al. |
| 9,152,643 B2 | 10/2015 | Whitehead et al. |
| 9,154,589 B1 | 10/2015 | Klein et al. |
| 9,210,100 B2 | 12/2015 | Van Der et al. |
| 9,256,374 B1 | 2/2016 | Aron et al. |
| 9,256,475 B1 | 2/2016 | Aron et al. |
| 9,317,223 B2 | 4/2016 | Reohr et al. |
| 9,354,912 B1 | 5/2016 | Aron et al. |
| 9,389,887 B1 | 7/2016 | Aron et al. |
| 9,575,784 B1 | 2/2017 | Aron et al. |
| 9,595,054 B2 | 3/2017 | Jain et al. |
| 9,619,257 B1 | 4/2017 | Aron et al. |
| 9,619,261 B2 | 4/2017 | Gaurav et al. |
| 9,626,275 B1 | 4/2017 | Hitchcock et al. |
| 9,641,385 B1 | 5/2017 | Daniel et al. |
| 9,705,817 B2 | 7/2017 | Lui et al. |
| 9,959,188 B1 | 5/2018 | Krishnan |
| 2004/0205206 A1 | 10/2004 | Naik et al. |
| 2006/0218551 A1 | 9/2006 | Berstis et al. |
| 2006/0224823 A1 | 10/2006 | Morley et al. |
| 2008/0147934 A1 | 6/2008 | Nonaka et al. |
| 2008/0320482 A1 | 12/2008 | Dawson et al. |
| 2010/0217651 A1 | 8/2010 | Crabtree et al. |
| 2011/0202657 A1* | 8/2011 | Chang .................... G06F 9/505 709/226 |
| 2012/0041914 A1 | 2/2012 | Tirunagari |
| 2012/0109619 A1 | 5/2012 | Gmach et al. |
| 2013/0086341 A1 | 4/2013 | Vasavi et al. |
| 2013/0174152 A1 | 7/2013 | Yu |
| 2014/0082614 A1 | 3/2014 | Klein et al. |
| 2014/0282525 A1 | 9/2014 | Sapuram et al. |
| 2014/0344453 A1 | 11/2014 | Varney et al. |
| 2015/0106578 A1 | 4/2015 | Warfield et al. |
| 2015/0169291 A1 | 6/2015 | Dube et al. |
| 2015/0234869 A1 | 8/2015 | Chan et al. |
| 2015/0379429 A1 | 12/2015 | Lee et al. |
| 2016/0019094 A1 | 1/2016 | Habdank et al. |
| 2016/0048408 A1 | 2/2016 | Madhu et al. |
| 2016/0203176 A1 | 7/2016 | Mills |
| 2016/0224384 A1* | 8/2016 | Gokhale ............... G06F 9/5016 |
| 2016/0359955 A1 | 12/2016 | Gill et al. |
| 2016/0373377 A1* | 12/2016 | Cao ...................... G06F 9/5088 |
| 2017/0031816 A1* | 2/2017 | Lee ..................... G06F 12/0253 |
| 2017/0364387 A1 | 12/2017 | Ahmed et al. |
| 2018/0046487 A1 | 2/2018 | Matters et al. |
| 2018/0060134 A1 | 3/2018 | Bianchini et al. |
| 2018/0225139 A1 | 8/2018 | Hahn et al. |

OTHER PUBLICATIONS

Dlessner, "Stay-Fit: Getting Ready for What Is Next in Prism", Nutanix, Inc., Dec. 8, 2015, 4 pages.
U.S. Appl. No. 15/006,435, filed Jan. 26, 2016, 65 pages.
U.S. Appl. No. 15/173,577, filed Jun. 3, 2016, 102 pages.
U.S. Appl. No. 15/191,387, filed Jun. 23, 2016, 59 pages.
Non-Final Office Action dated Mar. 22, 2018 for related U.S. Appl. No. 15/191,387.
Wikipedia. "Feasible region". Nov. 16, 2015. 2 pages.
"What Is Multiobjective Optimization?" Feb. 16, 2015. 1 page. http://www.mathworks.com/help/gads/what-is-multiobjective-optimization.html.
Caramia et al. "Multi-objective Optimization". 2008. 27 pages. Chapter 2. Springer-Verlag London.
Wikipedia. "Gittins index". Dec. 7, 2015. 6 pages.
Pandelis et al. "On the optimality of the Gittins index rule for multi-armed bandits with multiple plays". Jul. 1999. 13 pages.
Deel et al. "Linear Tape File System (LTFS) Format Specification". Dec. 21, 2013. 69 pages.
Non-Final Office Action dated Nov. 14, 2017 for related U.S. Appl. No. 15/186,235.
Notice of Allowance dated May 16, 2018 for related U.S. Appl. No. 15/186,235.
Non-Final Office Action dated May 24, 2018 for related U.S. Appl. No. 15/351,388.
Non-Final Office Action dated Jun. 8, 2018 for related U.S. Appl. No. 15/298,149.
Non-Final Office Action dated Jun. 29, 2018 for related U.S. Appl. No. 15/352,495.
Mei et al., Performance Analysis of Network I/O Workload in Virtualized Data Centers, 2010, IEEE, pp. 1-16 (Year: 2010).
Paul et al., Performance Monitoring and Capacity Planning, 2006, VMWorld, pp. 1-39 Centers (Year: 2006).
Final Office Action dated Aug. 15, 2018 for related U.S. Appl. No. 15/191,387.
Non-Final Office Action dated Sep. 6, 2018 for related U.S. Appl. No. 15/283,004, 5 pages.
Notice of Allowance dated Oct. 18, 2018 for related U.S. Appl. No. 15/298,149, 5 pages.
Advisory Action dated Nov. 1, 2018 for related U.S. Appl. No. 15/191,387, 3 pages.

\* cited by examiner

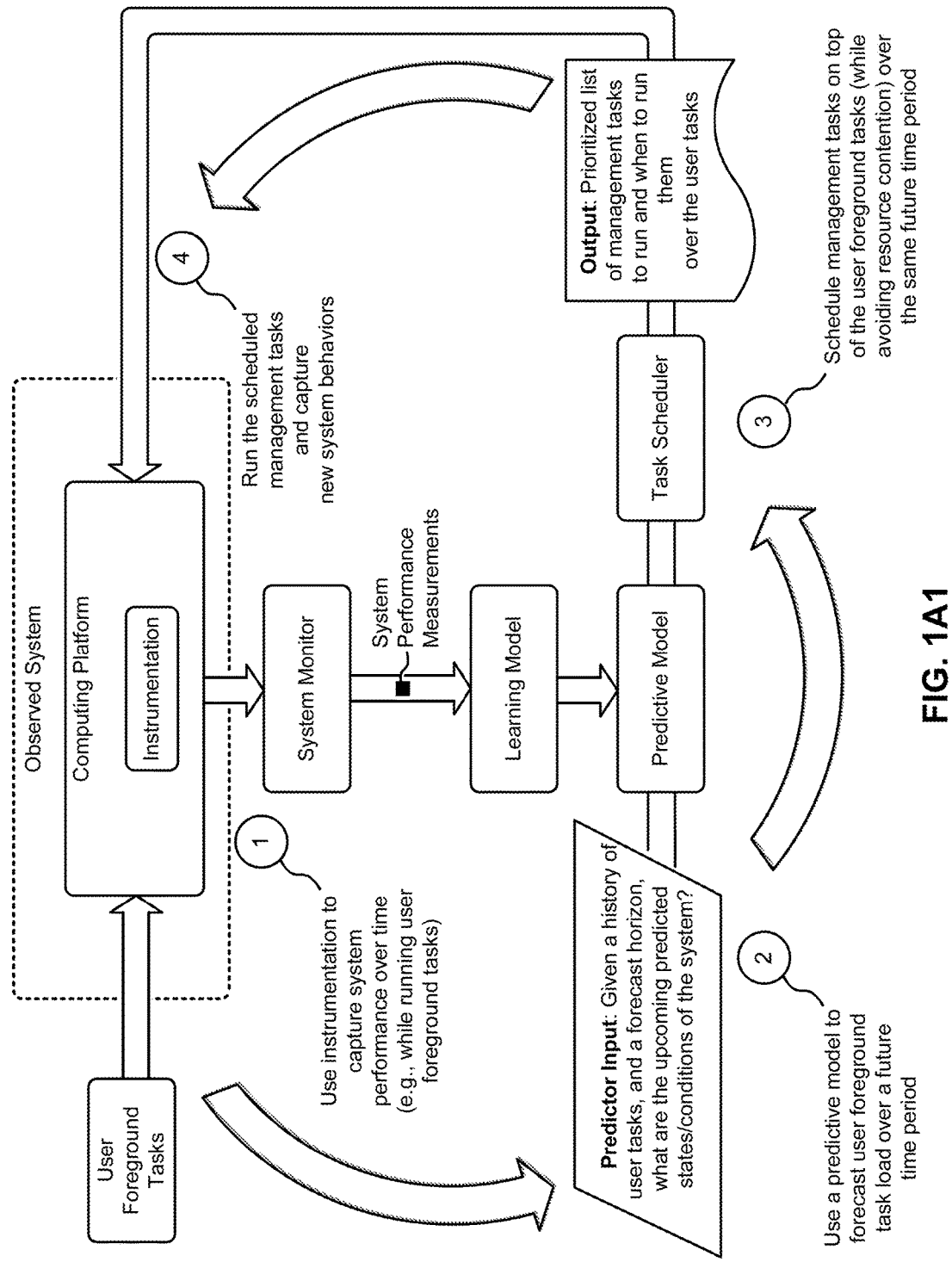
FIG. 1A1

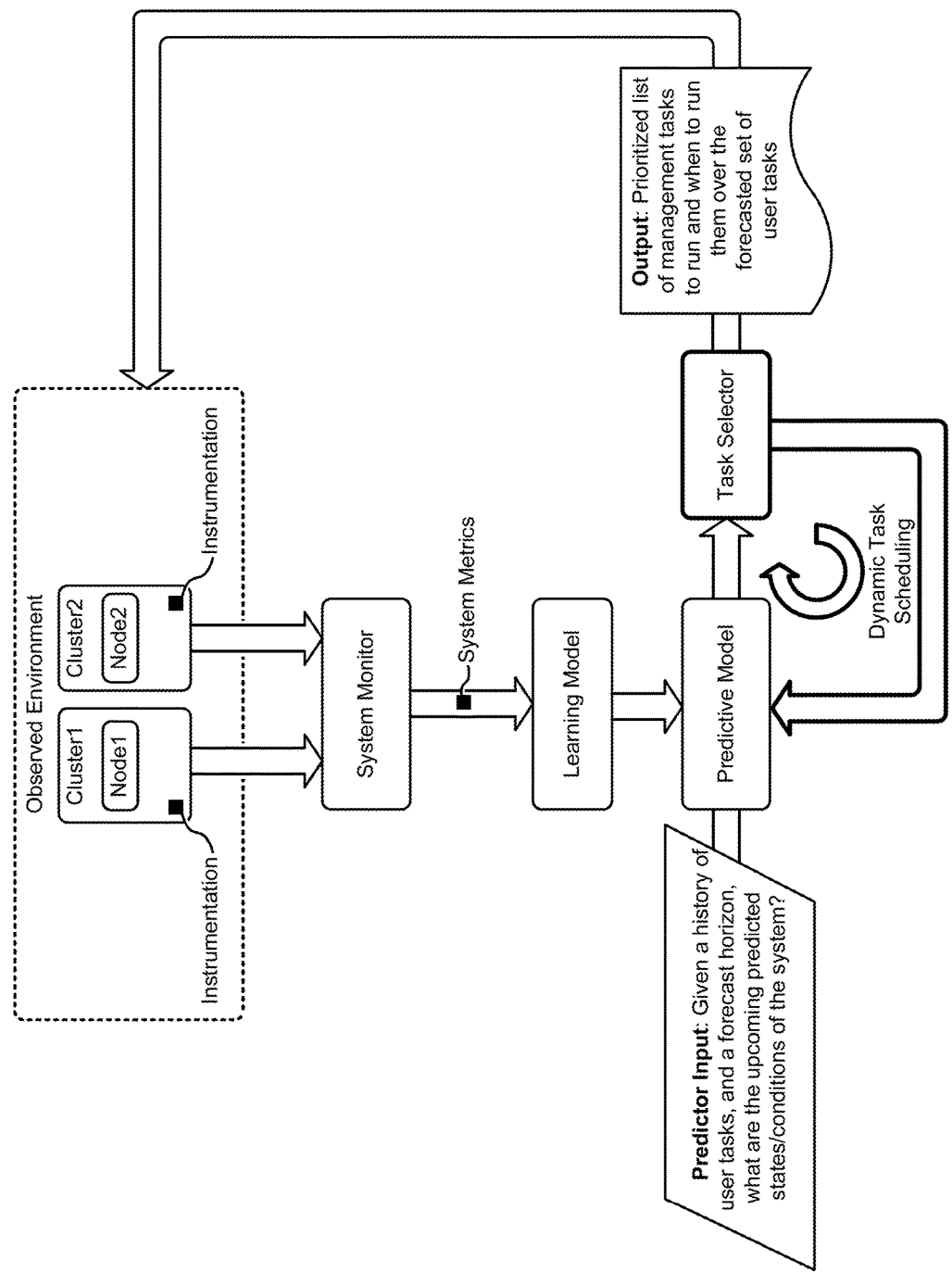
FIG. 1A2

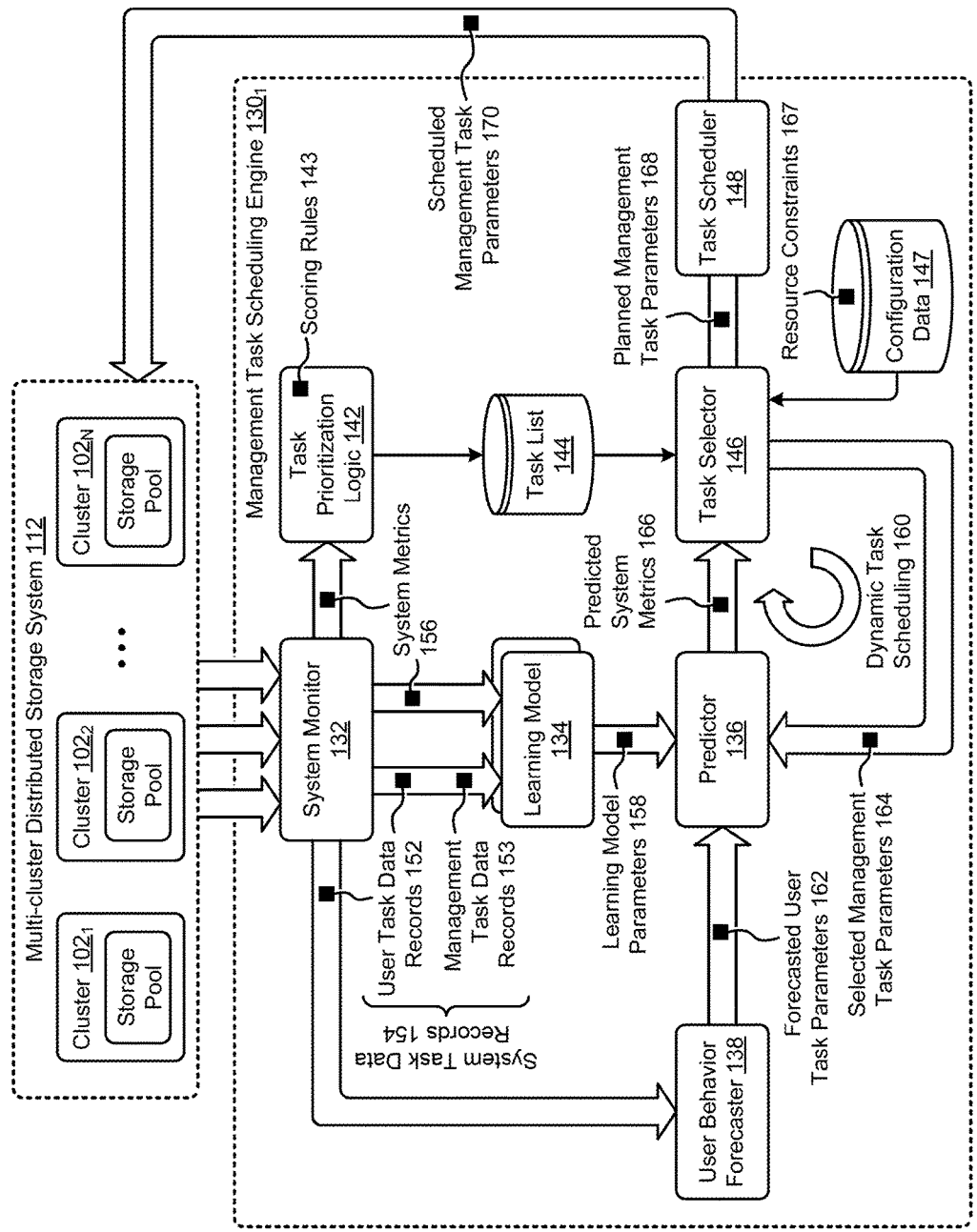
FIG. 1A3

US 10,168,953 B1

DYNAMIC SCHEDULING OF DISTRIBUTED STORAGE MANAGEMENT TASKS USING PREDICTED SYSTEM CHARACTERISTICS

FIELD

This disclosure relates to distributed data storage, and more particularly to techniques for dynamic scheduling of distributed storage management tasks using predicted system characteristics.

BACKGROUND

The use of virtual machines (VMs) in computing platform continues to increase. The storage-related demands of such VMs has fostered development and deployment of distributed storage systems. Today's distributed storage systems have evolved to comprise autonomous nodes that facilitate scaling to virtually any speed or capacity. In some cases, the distributed storage systems can comprise numerous nodes supporting multiple user VMs running a broad variation of applications, tasks, and/or processes. For example, in clusters that may host hundreds or thousands (or more) autonomous VMs, the storage I/O (input/output or IO) activity in the distributed storage system can be highly dynamic. With such large scale, highly dynamic distributed storage systems, certain management tasks (e.g., background tasks) may be executed to maintain a uniform and/or consistent performance level as may be demanded by a service level agreement (SLA) and/or as is expected by the users. Such management tasks might include tasks related to data replication (e.g., for disaster recovery, data protection policies, etc.), data movement (e.g., for disk balancing, information lifecycle management (ILM), etc.), data compression, and/or other processes. Execution of management tasks often improve the performance level of the system. Even though users recognize that management tasks necessarily consume cluster resources (e.g., nodes, CPU time, I/O, etc.), and even though the user of the distributed storage system might recognize the benefits facilitated by the execution of management tasks, the users do not want to experience reduced system performance.

Unfortunately, legacy techniques for scheduling maintenance tasks (e.g., to run as background tasks) in a large scale, highly dynamic distributed storage system often does impact system performance as experienced by its users. For example, legacy techniques continuously run system scans that continuously execute sets of background tasks (e.g., ILM tasks, disk balancing tasks, etc.). In this case, processing might be concurrent with user interactions with the system—even during periods of user-directed mission critical activities—resulting in an impact on performance (e.g., latency increase, sluggishness, etc.) that is observed by the user. Further, the specific set of tasks, and corresponding task schedule (e.g., launched sequence), associated with the scan might be predetermined in certain legacy approaches. Such legacy approaches can conflict with a particular user storage I/O characteristic occurring at the time the management tasks are executed. For example, a spike in user storage usage might be exacerbated by a concurrently scheduled data replication task or other storage-intensive management task. Further, a management task that is scheduled to use resources (e.g., nodes, paths, storage devices, etc.) used by one or more user VMs can impact the performance at those user VMs.

What is needed is a technique or techniques to improve over legacy and/or over other considered approaches. Some of the approaches described in this background section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

The present disclosure provides a detailed description of techniques used in systems, methods, and in computer program products for dynamic scheduling of distributed storage management tasks using predicted system characteristics, which techniques advance the relevant technologies to address technological issues with legacy approaches. More specifically, the present disclosure provides a detailed description of techniques used in systems, methods, and in computer program products for dynamic scheduling of distributed storage management tasks using predicted system characteristics.

Certain embodiments are directed to technological solutions for scheduling selected background tasks to manage a distributed storage system based on predicted system performance characteristics (e.g., metrics) derived from a predictive model, which embodiments advance the relevant technical fields as well as advancing peripheral technical fields. The disclosed embodiments modify and improve over legacy approaches. In particular, the herein-disclosed techniques provide technical solutions that address the technical problems attendant to scheduling background tasks that are used in the context of managing a large scale, highly dynamic distributed storage system without impacting system resource availability as demanded by its users. Such technical solutions serve to reduce the demand for computer memory, reduce the demand for computer processing power, and reduce the demand for inter-component communication. Some embodiments disclosed herein use techniques to improve the functioning of multiple systems within the disclosed environments, and some embodiments advance peripheral technical fields as well. As one specific example, use of the disclosed techniques and devices within the shown environments as depicted in the figures provide advances in the technical field of high-performance computing as well as advances in various technical fields related to distributed storage.

Further details of aspects, objectives, and advantages of the technological embodiments are described herein and in the following descriptions, drawings, and claims.

BRIEF DESCRIPTION OF THE DRAWINGS

The drawings described below are for illustration purposes only. The drawings are not intended to limit the scope of the present disclosure.

FIG. 1A1, FIG. 1A2, and FIG. 1A3 depict systems and techniques used for dynamic scheduling of distributed storage management tasks using predicted system characteristics, according to some embodiments.

FIG. 2 presents an environment in which embodiments of the present disclosure can operate.

DETAILED DESCRIPTION

Figure 1B:
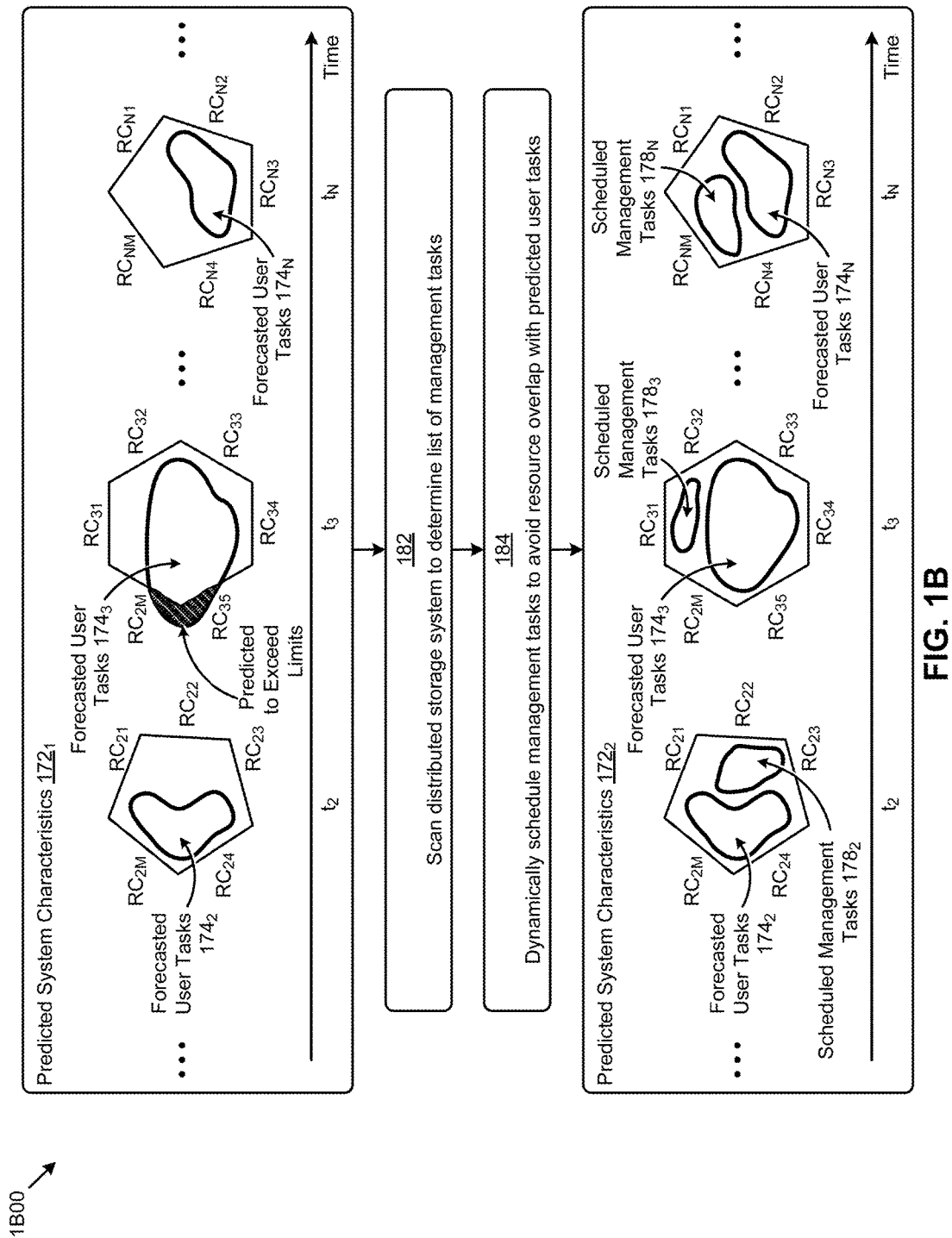
FIG. 1B illustrates a dynamic task scheduling scenario facilitated by systems for dynamic scheduling of distributed storage management tasks using predicted system characteristics, according to an embodiment.

Some embodiments of the present disclosure address the problem of scheduling background tasks to manage a large scale, highly dynamic distributed storage system without impacting system resource availability as demanded by its users and some embodiments are directed to approaches for scheduling selected background tasks to manage a distributed storage system based on predicted system performance characteristics derived from a predictive model. The accompanying figures and discussions herein present example environments, systems, methods, and computer program products for dynamic scheduling of distributed storage management tasks using predicted system characteristics.

Overview

Disclosed herein are techniques for scheduling selected background tasks to manage a distributed storage system based on predicted system performance characteristics derived from a predictive model. In certain embodiments, a learning model can be formed from historical system monitoring measurements to generate predicted system performance characteristics (e.g., metrics) corresponding to a set of forecasted user tasks and a set of selected management tasks. In some embodiments, the forecasted user tasks can be determined from historical user tasks. In some embodiments, the selected management tasks can be iteratively determined by analyzing (e.g., comparing to resource constraints, etc.) instances of the predicted performance characteristics associated with respective instances of selected management tasks. In certain embodiments, the selected management tasks can be derived from a task list generated by a set of task prioritization logic.

Various embodiments are described herein with reference to the figures. It should be noted that the figures are not necessarily drawn to scale and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment. An aspect or an advantage described in conjunction with a particular embodiment is not necessarily limited to that embodiment and can be practiced in any other embodiments even if not so illustrated. Also, references throughout this specification to "some embodiments" or "other embodiments" refers to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments.

Definitions

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Reference is now made in detail to certain embodiments. The disclosed embodiments are not intended to be limiting of the claims.

Descriptions of Example Embodiments

FIG. 1A1, FIG. 1A2, and FIG. 1A3 depict systems and techniques used for dynamic scheduling of distributed storage management tasks using predicted system characteristics, according to some embodiments. The shown techniques can be used for dynamic scheduling of distributed storage management tasks using predicted system characteristics. As an option, one or more variations of techniques or any aspect thereof may be implemented in the context of the architecture and functionality of the embodiments described herein. The techniques or any aspect thereof may be implemented in any environment.

As shown in FIG. 1A1, operational elements of a computing platform are configured with instrumentation that performs measurements during user foreground tasks on the computing platform (see step 1). Measurements that are emitted by the instruments are collected by a system monitor, which processes streams of measurements so as to output system performance measurements in the form of time-sequenced observations. Such observations are stored into a learning model that models observed responses of the computing platform upon running of the user foreground tasks. System behavior can be predicted based such a model. For example, if a user foreground task "Job1" is invoked daily at some particular time (say midnight) and the observations taken show heavy CPU utilization beginning at or about midnight, then correlations determined from analysis of the leaning model data (see FIG. 3B) can be used to predict that some future invocation of "Job1" will also exhibit heavy CPU utilization beginning at or about the same time as the invocation of Job1. A learning model can be formatted into a predictive model that is able to accept a set of inputs and produce outputs, which outputs predict the system responses to those inputs. Some embodiments of a predictor can accept a time period to be used as a forecasting horizon. Strictly as an example, a predictive model can forecast system loading based on a given input set of user foreground tasks (see step 2).

A system administrator might want to schedule execution of storage management tasks (e.g., backup jobs, defragmentation, etc.) in a manner so that running of such management tasks do not to reduce system performance as experienced by the foreground task users. In particular, contention for system resources between user foreground tasks and management tasks is to be avoided (see step 3).

Using techniques as disclosed herein, a predictive model can be used to generate a list of management tasks to be run, including when to run them. As shown, a prioritized list of management tasks to run (and when to run them) is output by the predictive model. The management tasks are then scheduled and run on the computing platform (see step 4). New measurements are taken. The measurements taken (e.g., stimulus measurements and response measurements) have sufficient specificity such that system behaviors (e.g., response measurements taken by the instrumentation) can be correlated (e.g., at least to a statistical certainty) to respective stimuli.

Figure 2:
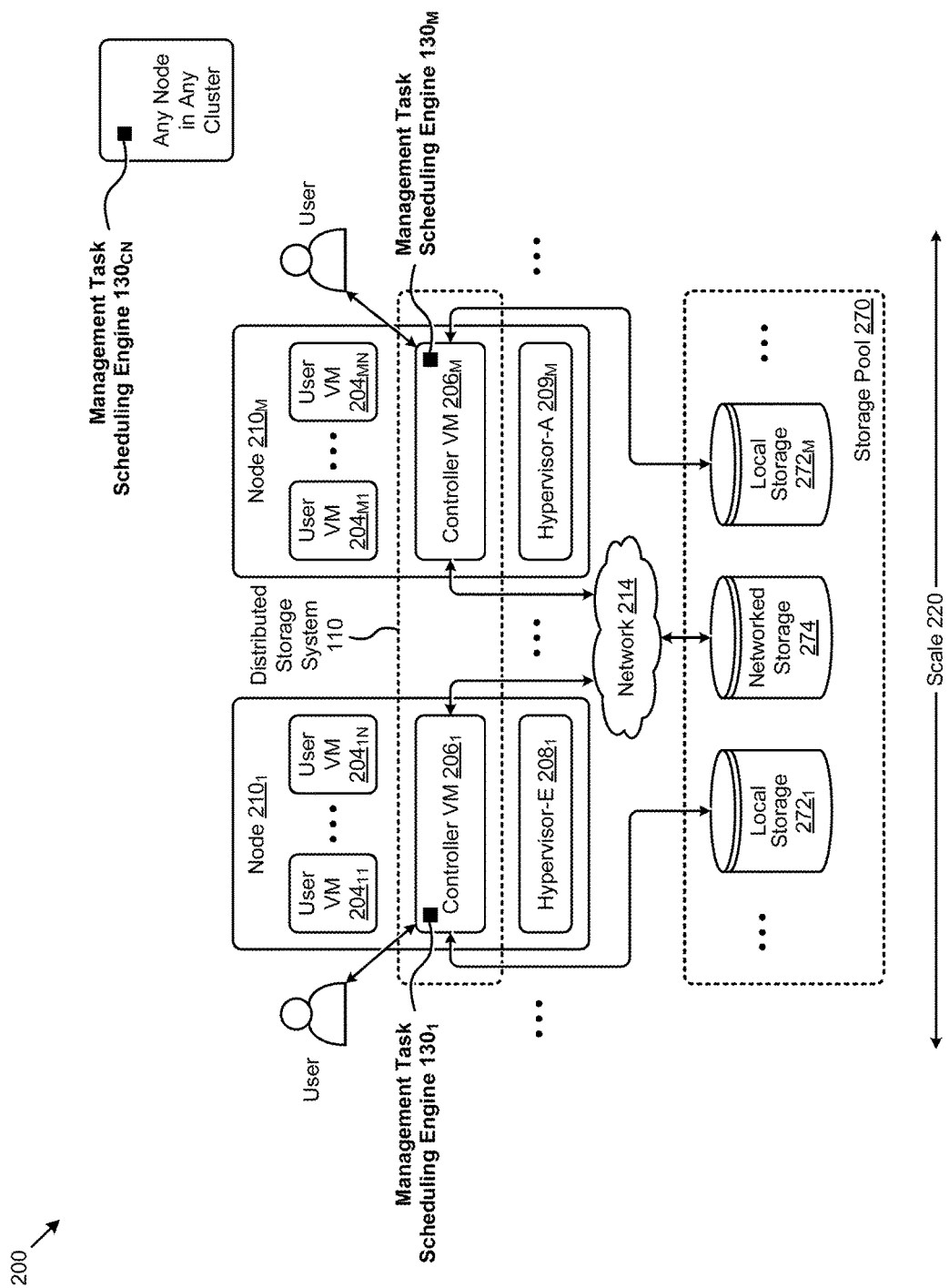

In FIG. 1A2, the system monitor receives observations from a multi-cluster computing system comprising two or more computing clusters (e.g., the shown cluster1 and cluster2). The predictive model produces outputs that can be used, as shown, by a task selector and by a task scheduler. As an example of uses of the aforementioned task selector and task scheduler in a scenario of ongoing cluster management, various different storage management tasks might need to be performed periodically. A task selector can accept a list of tasks to be performed (e.g., defragmentation, deduplication, etc.) and select a first task based on forecasted available resources (e.g., such that user foreground tasks are not observably impacted). Having selected a first task, the task selector might provide a loop-back such that a second task might also be selected to be performed in the same forecasted period. This loop-back can be traversed iteratively, with each iteration accounting for the predicted system resource demands of the previous set of selected tasks (e.g., the aforementioned first task, second task, etc.). In some cases, a task scheduler can schedule multiple tasks to be invoked in parallel at the beginning of a forecasted period. In other cases, multiple tasks can be invoked in some succession throughout the forecasted period. In still other cases, the order and timing of a succession of invocations can be determined by a task scheduler. Heuristics or rules can be used to facilitate dynamic task scheduling. For example, it might be a rule to run deduplication tasks before running defragmentation tasks. Various inter-relationships between tasks and/or nodes can be included in rules. In some cases, the heuristics or rules to facilitate dynamic task scheduling might include heuristics or rules for selecting management tasks to be run where the selection is based on an inter-relationship between a first management task and a second management task. Further, selecting based on an inter-relationship between a first management task and a second management task might be based on interrelated times of releases of resources (e.g., see the shown indication of release of resources for UT1 and the shown indication of release of resources for MTN).

The embodiment of FIG. 1A2 is illustrative of a system configuration that applies in many scenarios. In some situations, the observed system is a large system, possibly involving multiple storage pools (e.g., individual storage pools per cluster) and possibly involving a large number of computing nodes per cluster. Moreover, in some situations one cluster can communicate with another cluster in a multi-cluster distributed storage system configuration.

The embodiment shown in FIG. 1A3 comprises a multi-cluster distributed storage system 112 having multiple storage clusters (e.g., cluster $102_1$, cluster $102_2$, . . . , cluster $102_N$), each cluster having an associated distributed storage fabric. Each one of the clusters comprise multiple nodes, which in turn comprise multiple user VMs that exhibit CPU loading, storage I/O (input/output or IO) activity, and/or other behaviors that can be highly dynamic (e.g., high variance over time). With such highly dynamic distributed storage systems, certain management tasks (e.g., background tasks) can be required to maintain a uniform and/or consistent performance level expected by the users. Such management tasks might include tasks beyond the aforementioned deduplication and defragmentation tasks. Storage management tasks can encompass tasks related to data replication (e.g., for disaster recovery, data protection policies, etc.), data movement (e.g., for disk balancing, information lifecycle management (ILM), etc.), data compression, and/or other processes. Legacy techniques for scheduling background tasks to manage a large scale, highly dynamic distributed storage system (e.g., the multi-cluster distributed storage system 112) are very limited in their ability to schedule the tasks without impacting the system performance or "uptime" as experienced by its users.

As shown, the herein-disclosed techniques can address the foregoing challenges attendant to scheduling background tasks to manage a large scale, highly dynamic distributed storage system—without impacting system resource availability as demanded by its users—using a management task scheduling engine. Specifically, the management task scheduling engine $130_1$ can comprise a system monitor 132 to collect various instances of system task data records 154 and system metrics 156 from the multi-cluster distributed storage system 112. As an example, the system task data records 154 might comprise instances of user task data records 152 (e.g., associated with user activity) and instances of management task data records 153 (e.g., associated with background system management activity). Such varying task data might be distinguished using a process identifier. In some cases, the data records can be received from various components of the distributed storage system such that low order details can be collected (e.g., user-specific data, node-specific data, etc.).

The system task data records 154 and the system metrics 156 can be used to generate one or more learning models (e.g., learning model 134). Such learning models can be used to characterize various correlations between the system tasks and system metrics (e.g., CPU usage, storage consumption, bandwidth consumption, etc.). More specifically, the learning models might characterize correlations between user tasks and system metrics, and correlation between management tasks and system metrics. In some cases, an ensemble of learning models might be used to account for limitations of any one model or algorithm. For example, a given model might have certain favorable attributes, but might be limited in predicting certain seasonalities. With the ensemble of learning models, a selection tournament can be executed to identify the best model for a given environment, historical time range, and/or other model input (e.g., constraint). The learning model 134 shown can represent the selected model from the ensemble of learning models.

Further details regarding general approaches to predicting workloads and seasonalities are described in U.S. Provisional Application Ser. No. 62/243,655 titled "SEASONAL TIME SERIES ANALYSIS AND FORECASTING USING A DISTRIBUTED TOURNAMENT SELECTION PROCESS filed on Oct. 19, 2015, which is hereby incorporated by reference in its entirety.

A set of learning model parameters 158 (e.g., input variables, output variables, equations, equation coefficients, mapping relationships, limits, constraints, etc.) describing the learning model 134 can be used by a predictor 136 to generate a set of predicted system metrics 166 describing various predicted system performance attributes of the multi-cluster distributed storage system 112. Specifically, a user behavior forecaster 138 can determine a set of forecasted user task parameters 162 characterizing a respective set of forecasted user tasks in a given forecast time window that can be applied (e.g., as inputs) to the predictor 136 to generate an instance of the predicted system metrics 166. In some cases, the user behavior forecaster 138 can use the user task data records 152 (e.g., associated with historical user activity) to determine the forecasted user task parameters 162.

According to certain embodiments, a task selector 146 can determine a set of selected management task parameters 164 based, in part, on the predicted system metrics 166. For example, the selected management task parameters 164 might correspond to certain management tasks that can be scheduled and executed without negatively impacting the system performance (e.g., characterized by the predicted system metrics 166) associated with the forecasted user activity. In some cases, the task selector 146 might use a set of configuration data 147 describing, in part, the resource constraints 167 associated with the configuration (e.g., number of nodes, node processing capacity, storage capacity, etc.) of the multi-cluster distributed storage system 112 when selecting the management tasks. In certain embodiments, the task selector 146 can select management tasks from a task list 144. More specifically, the task list 144 might be generated and/or maintained by a set of task prioritization logic 142 based, in part, on the system metrics 156. For example, a full or partial scan of the multi-cluster distributed storage system 112 might generate a set of system metrics 156 that suggest or indicate that certain management tasks should be scheduled to maintain various system and/or user performance attributes (e.g., service levels, policy compliance, etc.). The task prioritization logic 142 might use a set of scoring rules 143 to prioritize such identified management tasks to facilitate selection by the task selector 146.

The selected management task parameters 164 selected by the task selector 146 can be applied to the predictor 136 with the forecasted user task parameters 162 to determine another instance of the predicted system metrics 166. Additional instances of selected management task parameters 164 can be selected by the task selector 146 in an iterative loop (see dynamic task scheduling 160) until the task selector 146 determines that no further management tasks are necessary or that no further management tasks can be expeditiously scheduled for the given time window. In some cases, the dynamic scheduling might be responsive to an updated set of system metrics 156 received by the management task scheduling engine 130$_1$. The resulting instances of planned management task parameters 168 can then be delivered to a task scheduler 148 to generate a set of scheduled management task parameters 170 describing an execution schedule to be executed on the multi-cluster distributed storage system 112. For example, the scheduled management task parameters 170 can identify the type of task, the time to execute the task, the VM to run the task, and/or other task scheduling attributes.

One illustrative scenario showing dynamic management task scheduling facilitated by the management task scheduling engine 130$_1$ according to the herein disclosed techniques is described in FIG. 1B, according to certain embodiments.

FIG. 1B illustrates a dynamic task scheduling scenario 1B00 facilitated by systems for dynamic scheduling of distributed storage management tasks using predicted system characteristics. As an option, one or more variations of dynamic task scheduling scenario 1B00 or any aspect thereof may be implemented in the context of the architecture and functionality of the embodiments described herein. The dynamic task scheduling scenario 1B00 or any aspect thereof may be implemented in any environment.

The scenario shown in FIG. 1B shows a collection of predicted system characteristics 172$_1$ comprising various forecasted user task resource consumption spaces with associated resource constraint spaces over time (e.g., . . . , $t_2$, $t_3$, . . . , $t_N$). Specifically, a resource consumption space associated with a set of forecasted user tasks 174$_2$ and a resource constraint space bounded by various resource constraints (e.g., $RC_{21}$, $RC_{22}$, $RC_{23}$, $RC_{24}$, . . . , $RC_{2M}$) is shown at time $t_2$. Further, a resource consumption space associated with a set of forecasted user tasks 174$_3$ and a resource constraint space bounded by various resource constraints (e.g., $RC_{31}$, $RC_{32}$, $RC_{33}$, $RC_{34}$, $RC_{35}$, . . . , $RC_{2M}$) is shown at time $t_3$. Also, a resource consumption space associated with a set of forecasted user tasks 174$_N$ and a resource constraint space bounded by various resource constraints (e.g., $RC_{N1}$, $RC_{N2}$, $RC_{N3}$, $RC_{N4}$, . . . , $RC_{NM}$) is shown at time $t_N$. As shown, the resource consumption associated with the forecasted user tasks 174$_2$ and the forecasted user tasks 174$_N$ is predicted to be within the respective resource constraints, however the resource consumption associated with the forecasted user tasks 174$_3$ is predicted to exceed the respective resource constraints. For all shown representative times, there exists at least some available resources as indicated by the area within the resource constraint space not occupied by the forecasted user task resource consumption space.

According to the herein disclosed techniques, such available resources can be used to schedule certain management tasks with minimal impact to the user's job's resource availability. Specifically, the techniques described herein can facilitate a scan of the distributed storage system to determine a list of management tasks that the system might require (see operation 182). For example, in the dynamic task scheduling scenario 1B00 shown, the scan might identify certain management tasks that can remediate the breach of the resource constraints at time $t_3$. The disclosed techniques can further be applied to dynamically schedule management tasks based on predicted user tasks (see operation 184). Specifically, parameters describing the predicted system characteristics $172_1$ might be used to schedule certain management tasks selected from the list of management tasks as illustrated in a set of predicted system characteristics $172_2$. As shown, the predicted system characteristics $172_2$ comprises various forecasted user task resource consumption spaces and scheduled management task consumption spaces with associated resource constraint spaces over time (e.g., ..., $t_2$, $t_3$, ..., $t_N$). In this scenario, the resource constraint spaces in the predicted system characteristics $172_2$ are the same as the resource constraint spaces in the predicted system characteristics $172_1$. However, the forecasted user task resource consumption spaces can vary based on the scheduled management tasks selected.

Specifically, resource consumption spaces associated with a set of forecasted user tasks $174_2$ and a set of scheduled management tasks $178_2$ are shown at time $t_2$. Further, resource consumption spaces associated with a set of forecasted user tasks $174_3$ and a set of scheduled management tasks $178_3$ are shown at time $t_3$. Also, the resource consumption spaces associated with a set of forecasted user tasks $174_N$ and a set of scheduled management tasks $178_N$ are shown at time $t_N$. As shown, the scheduled management tasks can be selected based, in part, on the resource availability at a given time. Such dynamic scheduling is illustrated in the predicted system characteristics $172_2$ by the resource consumption spaces of the forecasted user tasks and the scheduled management tasks being within the respective resource constraint spaces at each representative time. In some cases, the scheduled management tasks might remediate certain predicted performance issues corresponding to the forecasted user activity. For example, the resource constraint breach for the forecasted user tasks $174_2$ in the predicted system characteristics $172_1$ might be remediated by the scheduled management tasks $178_2$ and/or the scheduled management tasks $178_3$, resulting in a predicted resource consumption for the forecasted user tasks $174_3$ that remains within the resource constraint space at time $t_3$. In some cases, multiple iterations of management task selection might be required to determine the set of management tasks to be scheduled.

As earlier described, the herein disclosed techniques can address the problems attendant to scheduling background tasks to manage a large scale, highly dynamic distributed storage system without contending for system resource availability as demanded by its foreground tasks. One embodiment of an environment comprising such a distributed storage infrastructure is described in FIG. 2.

FIG. 2 presents an environment 200 in which embodiments of the present disclosure can operate. As an option, one or more variations of environment 200 or any aspect thereof may be implemented in the context of the architecture and functionality of the embodiments described herein.

The environment 200 shows various components associated with one instance of a distributed storage system 110 for which management tasks can be dynamically scheduled according to the herein disclosed techniques. Specifically, the environment 200 can comprise multiple nodes (e.g., node $210_1$, ..., node $210_M$) that have multiple tiers of storage in a storage pool 270. For example, each node can be associated with one server, multiple servers, or portions of a server. The multiple tiers of storage can include storage that is accessible through the network 214, such as a networked storage 274 (e.g., a storage area network (SAN)). The storage pool 270 can also comprise one or more instances of local storage (e.g., local storage $272_1$, ..., local storage $272_M$) that is within or directly attached to a server and/or appliance associated with the nodes. Such local storage can include solid state drives (SSDs), hard disk drives (HDDs), and/or other storage devices.

Each node can run virtualization software (e.g., VMware ESXi, Microsoft Hyper-V, RedHat KVM, Nutanix AHV, etc.) that includes a hypervisor. For example, a hypervisor-E $208_1$ might correspond to VMware ESXi software, and a hypervisor-A $209_M$ might correspond to Nutanix AHV software. Such hypervisors can manage the interactions between the underlying hardware and one or more user VMs (e.g., user VM $204_{11}$, ..., user VM $204_{1N}$, ..., user VM $204_{M1}$, ..., user VM $204_{MN}$) that run client software.

A special instance of a virtual machine can be used to manage storage and I/O activities according to some embodiments. Multiple instances of such controller VMs (e.g., controller VM $206_1$, ..., controller VM $206_M$) coordinate within a cluster to form the distributed storage system 110 which can, among other operations, manage the storage pool 270. The controller VMs are not formed as part of specific implementations of the hypervisors. Instead, the controller VMs run as virtual machines above the hypervisors on the various servers. Since the controller VMs run above the hypervisors, varying virtual machine architectures and/or hypervisors can operate within the distributed storage system 110. This architecture further facilitates efficient scaling of the distributed computing and/or storage platform (e.g., see scale 220).

In one or more embodiments, one or more instances of the management task scheduling engine disclosed herein can be implemented in the distributed storage system 110. Specifically, an instance of the management task scheduling engine $130_1$ can be implemented in the controller VM $206_1$, and another instance of the management task scheduling engine $130_M$ can be implemented in the controller VM $206_M$. Further, in certain embodiments, a management task scheduling engine $130_{CN}$ can be implemented in any node in any cluster. In some cases, the instances of the management task scheduling engine on each node can be controlled by an elected master instance of the management task scheduling engine that manages task and job delegation to the various nodes in a cluster.

As earlier described, the herein disclosed techniques can use a learning model to characterize various relationships between system tasks and certain system metrics. Further details pertaining to such techniques are described in FIG. 3A, FIG. 3B, and FIG. 3C.

Figure 3A:
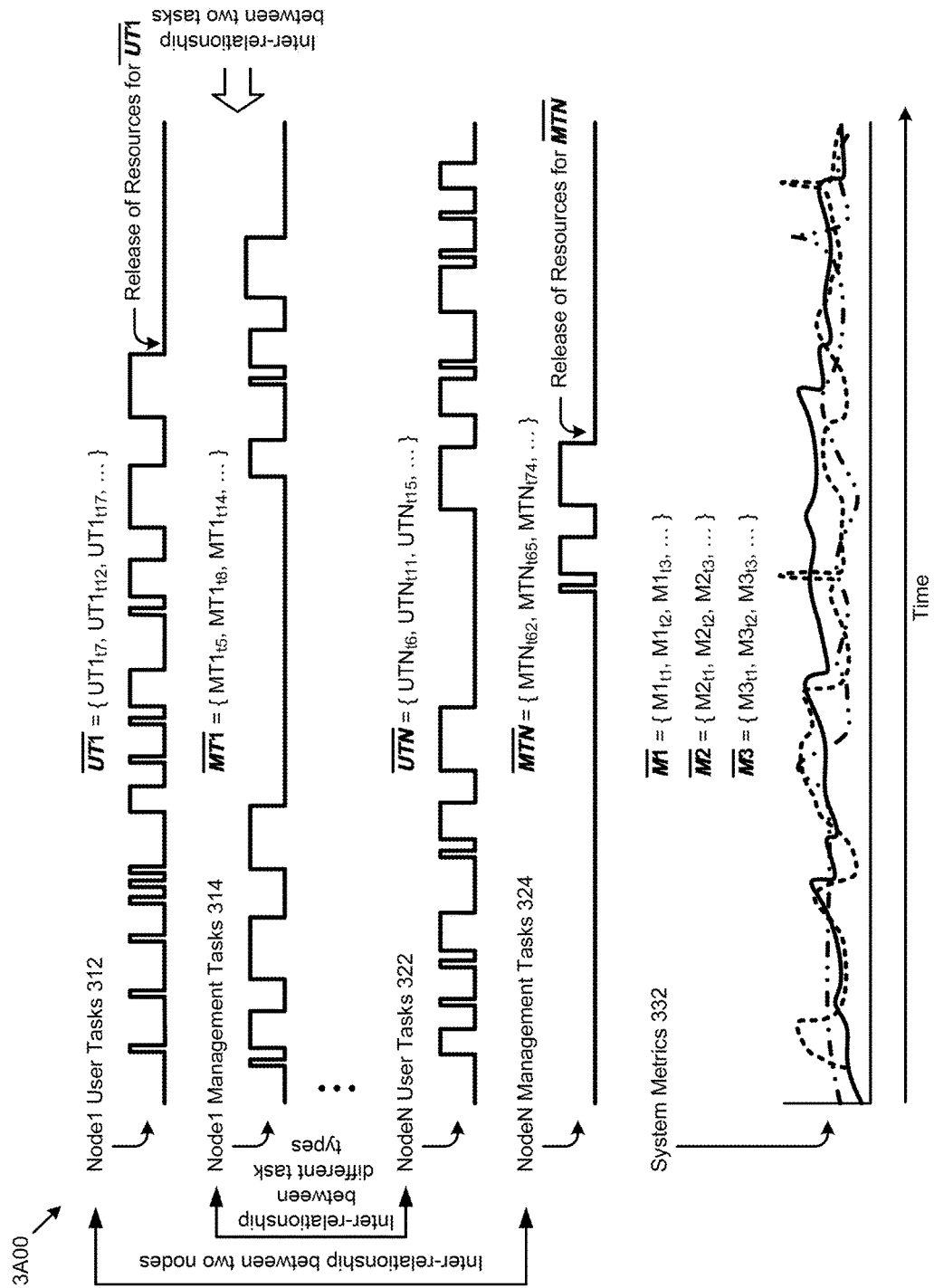
FIG. 3A presents a diagram illustrating system task signals and system metric signals for a distributed storage system.

FIG. 3A presents a diagram 3A00 illustrating system task signals and system metric signals for a distributed storage system. As an option, one or more variations of diagram 3A00 or any aspect thereof may be implemented in the context of the architecture and functionality of the embodiments described herein. The diagram 3A00 or any aspect thereof may be implemented in any environment.

The diagram 3A00 illustrates a time-series visualization of a representative sample of various system tasks (e.g., user tasks and management tasks) and measured system metrics associated with a given distributed storage system (e.g., comprising one or more clusters). Specifically shown are time varying signals corresponding to: node1 user tasks 312, node1 management tasks 314, nodeN user tasks 322, nodeN management tasks 324, and system metrics 332. The system tasks and metrics shown in FIG. 3A and discussed herein can be formed as a sequential time-series (e.g., sequences) of data items (e.g., attributes, values, measurements) representing various task instances and various metric instances, respectively. For example, the signal pulses associated with the various system tasks can represent certain times and durations of the items comprising the task sequences. When the time interval between data items is short (e.g., seconds or minutes) for a given sequence (e.g., system metrics 332), a visualization plot of the sequence can appear as a continuous signal.

For notational convenience, the temporal system task and metric signals can be represented as vectors, such as the user task vector $\overline{UT1}$ corresponding to node1 user tasks 312, the management task vector $\overline{MT1}$ corresponding to node1 management tasks 314, the user task vector $\overline{UTN}$ corresponding to nodeN user tasks 322, the management task vector $\overline{MTN}$ corresponding to nodeN management tasks 324, and the metric vectors $\overline{M1}$, $\overline{M2}$, and $\overline{M3}$ corresponding to system metrics 332. As an example, metric vectors $\overline{M1}$, $\overline{M2}$, and $\overline{M3}$ might represent metrics associated with CPU loading, storage usage, and storage I/O activity, respectively. As another example, metric vectors $\overline{M1}$, $\overline{M2}$, and $\overline{M3}$ might represent a single metric (e.g., CPU loading) at various nodes (e.g., node1, node2, and node3, respectively). As shown, system metrics 332, when aggregated, can comprise a noisy signal, presenting a challenge to identifying respective correlations between systems tasks and system metrics. In such cases, the technological solution provided by the herein disclosed techniques can be implemented to discover such correlations as described in FIG. 3B.

Figure 3B:
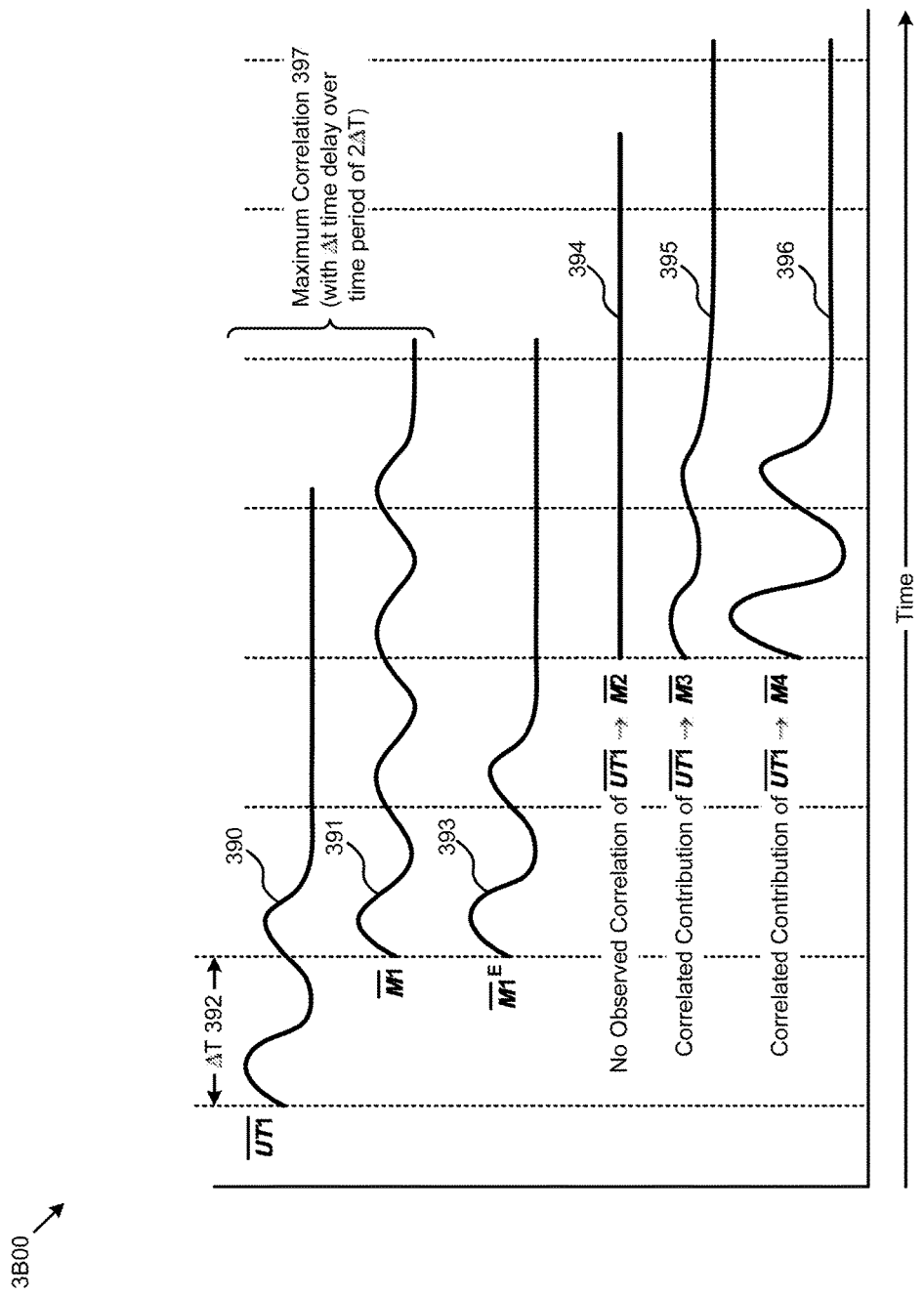
FIG. 3B presents a correlation chart showing time-based and value-based correlation techniques used in systems for dynamic scheduling of distributed storage management tasks using predicted system characteristics, according to some embodiments.

FIG. 3B presents a correlation chart 3B00 showing time-based and value-based correlation techniques used in systems for dynamic scheduling of distributed storage management tasks using predicted system characteristics. As an option, one or more variations of correlation chart 3B00 or any aspect thereof may be implemented in the context of the architecture and functionality of the embodiments described herein. The correlation chart 3B00 or any aspect thereof may be implemented in any environment.

User tasks executed at node1 (e.g., $\overline{UT1}$) in a distributed storage system might produce measured metrics at node1 (e.g., $\overline{M1}$). Additionally, the user tasks at node1 (e.g., $\overline{UT1}$) might produce results, or lack of results, as given by measured results at a different node and/or metric in the system (e.g., $\overline{M3}$). Such correlation of results or lack of results can be automatically detected, and a scalar value representing the extent of correlation can be determined mathematically from any pair of vectors. In the discussions just below, the correlation of a time-series system metric vector is considered with respect to a time-series system task vector. In some cases (e.g., noisy system metric signals with multiple system task signals), the correlation between system tasks and system metrics can be one-to-many or many-to-one. Correlations can be positive (e.g., the time-series data moves in the same direction), or negative (e.g., the time-series data moves in the opposite direction), or zero (e.g., no correlation). Those skilled in the art will recognize there are many known-in-the-art techniques to correlate any pair of curves. For example, correlation can be based on a spatial distance and/or a temporal distance between data item attributes characterizing a system task sequence and a system metric sequence.

As shown, vector $\overline{UT1}$ is comprised of a series of changing values (e.g., depicted by the regression-fitted function resulting in curve 390). The vector $\overline{M1}$ is shown as curve 391. As can be appreciated, even though curve 391 is not identical to curve 390 (e.g., curve 391 has undulations in the tail), curve 391 is substantially value-correlated to curve 390. Maximum value correlation 397 occurs when curve 391 is time-shifted by a ΔT 392 amount of time relative to curve 390 (see the ΔT 392 graduations on the time scale) and a time period of 2ΔT is considered. For example, the ΔT 392 might represent a delay in the response to a given task (e.g., a later change to storage usage after an earlier data move task). The amount of correlation and amount of time shift can be automatically determined. Various examples of cross-channel correlations are presented in Table 1 and in FIG. 3B.

TABLE 1

Cross-correlation examples

| System Task → System Metric | Description |
|---|---|
| $\overline{UT1}$ → $\overline{M2}$ (see curve 394) | No correlation |
| $\overline{UT1}$ → $\overline{M3}$ (see curve 395) | Correlates if time is shifted and attenuated |
| $\overline{UT1}$ → $\overline{M4}$ (see curve 396) | Correlates if time is shifted and amplified |

In some cases, a correlation calculation can identify a negative correlation where an increase in a certain system task (e.g., map-reduce operation) causes a decrease in a system metric (e.g., storage access latency). Further, in some cases, a correlation calculation can identify an inverse correlation where a large increase in a certain system task causes a small increase in a system metric. In still further cases, there can be no observed correlation (e.g., see curve 394), or in some cases correlation is increased when exogenous variables are considered (e.g., see curve $\overline{MT}^E$ 393).

In some cases a correlation calculation can hypothesize one or more causation effects. In some cases correlation conditions are considered when calculating correlation such that a priori known conditions can be included (or excluded) from the correlation calculations.

Also, as can be appreciated, there is no correlation to the shown time-series M2. The curve 395 is substantially value-correlated (e.g., though scaled down) to curve 390, and is time-shifted by a second ΔT amount of time relative to curve 390. The curve 396 is substantially value-correlated (e.g., though scaled up) to curve 390, and is time-shifted by a second ΔT amount of time relative to curve 390.

In some cases, correlation parameters are provided to handle specific correlation cases. In one case, the correlation between two time-series can be determined to a scalar value r (e.g., using known-in-the art calculations such as Pearson's product-moment coefficient).

Other correlation techniques are possible, and a system manager might provide an indication and parameters associated with such alternative correlations. In some cases, while modeling a time-series, not all the scalar values in the time-series are weighted equally. For example, more recent time-series data values found in the historical data can be given a higher weight as compared to older ones. Various shapes of weights to overlay a time-series are possible, and one exemplary shape is the shape of an exponentially decaying model.

The foregoing correlation techniques can be implemented by the herein disclosed techniques to generate various predictive modeling parameters used in systems for dynamic scheduling of distributed storage management tasks using predicted system characteristics. One such predictive modeling parameter generation technique is described in FIG. 3C.

Figure 3C:
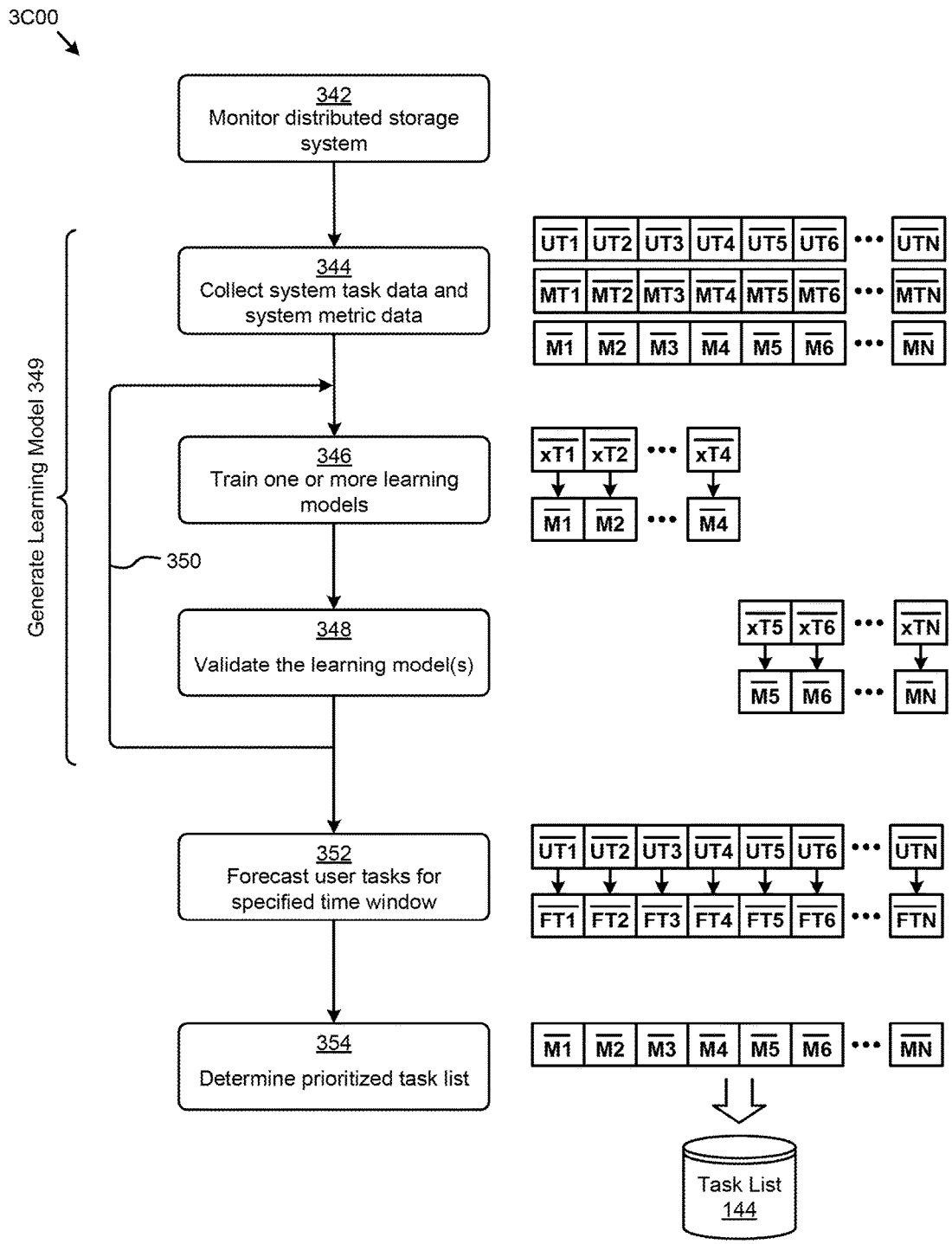
FIG. 3C presents a predictive modeling parameter generation technique used in systems for dynamic scheduling of distributed storage management tasks using predicted system characteristics, according to some embodiments.

FIG. 3C presents a predictive modeling parameter generation technique 3C00 used in systems for dynamic scheduling of distributed storage management tasks using predicted system characteristics. As an option, one or more variations of a predictive modeling parameter generation technique 3C00 or any aspect thereof may be implemented in the context of the architecture and functionality of the embodiments described herein. The predictive modeling parameter generation technique 3C00 or any aspect thereof may be implemented in any environment.

The predictive modeling parameter generation technique 3C00 depicts certain operations for generating parameters characterizing one or more learning models (see grouping 349) and/or other parameters that can be used by the herein disclosed techniques. As shown, a subject distributed storage system can be monitored (see operation 342) for certain activity pertaining to system user tasks, system management tasks (e.g., background tasks), and/or system metrics. Specifically, various sets of system task data (e.g., system task data records) and/or system metric data (e.g., system metric data records) can be collected (see operation 344). For example, and as shown, various time-series vectors corresponding to user tasks (e.g., $\overline{UT1}$, $\overline{UT2}$, ..., $\overline{UTN}$), management tasks (e.g., $\overline{MT1}$, $\overline{MT2}$, ..., $\overline{MTN}$), and/or system metrics (e.g., $\overline{M1}$, $\overline{M2}$, ..., $\overline{MN}$) might be collected. The vectors for a given category (e.g., user tasks, management tasks, system metrics, etc.) can correspond to various attributes (e.g., dimensions). Specifically, as an example, user task vector $\overline{UTn}$, management task vector $\overline{MTn}$, and system metric vector $\overline{Mn}$ might correspond to node n in a cluster within the distributed storage system.

A portion of the collected data (e.g., $\overline{xT1}$-$\overline{xT4}$, $\overline{M1}$-$\overline{M4}$) can be used to train one or more learning models (see operation 346). A different portion of the collected data (e.g., $\overline{xT5}$-$\overline{xTN}$, $\overline{M5}$-$\overline{MN}$) can be used to validate the learning models (see operation 348). The processes of training and/or validating can be iterated (see path 350) until the learning models behave within target tolerances (e.g., with respect to predictive statistic metrics, descriptive statistics, significance tests, etc.). In some cases, additional historical data can be collected to further train and/or validate the learning models. When the learning models have been generated, a set of learning model parameters (e.g., input variables, output variables, equations, equation coefficients, mapping relationships, limits, constraints, etc.) describing the learning models can be availed to various components (e.g., a predictor) used to implement the herein disclosed techniques.

Other parameters used by the herein disclosed techniques in certain embodiments include forecasted user tasks. Such forecasted user tasks might be determined for a specified time window (e.g., next 30 days) based in part on the collected user task data (see operation 352). For example, and as shown, the collected user task data vectors (e.g., $\overline{UT1}$, $\overline{UT2}$, ..., $\overline{UTN}$) might be used to generate a set of forecasted user task vectors (e.g., $\overline{FT1}$, $\overline{FT2}$, ..., $\overline{FTN}$). Further, the task list 144 earlier mentioned might be determined based on at least a portion of the collected system metrics (see operation 354). Specifically, the system metrics vectors (e.g., $\overline{M1}$, $\overline{M2}$, ..., $\overline{MN}$) can be analyzed to determine the tasks comprising the task list 144 and/or prioritize the tasks comprising the task list 144. For example, a given system metric vector might indicate that the storage requirement at a certain node and/or time exceeds an associated storage capacity, resulting in one or more storage reduction management tasks being added to the task list 144 and/or raised in priority on the task list 144.

Figure 4:
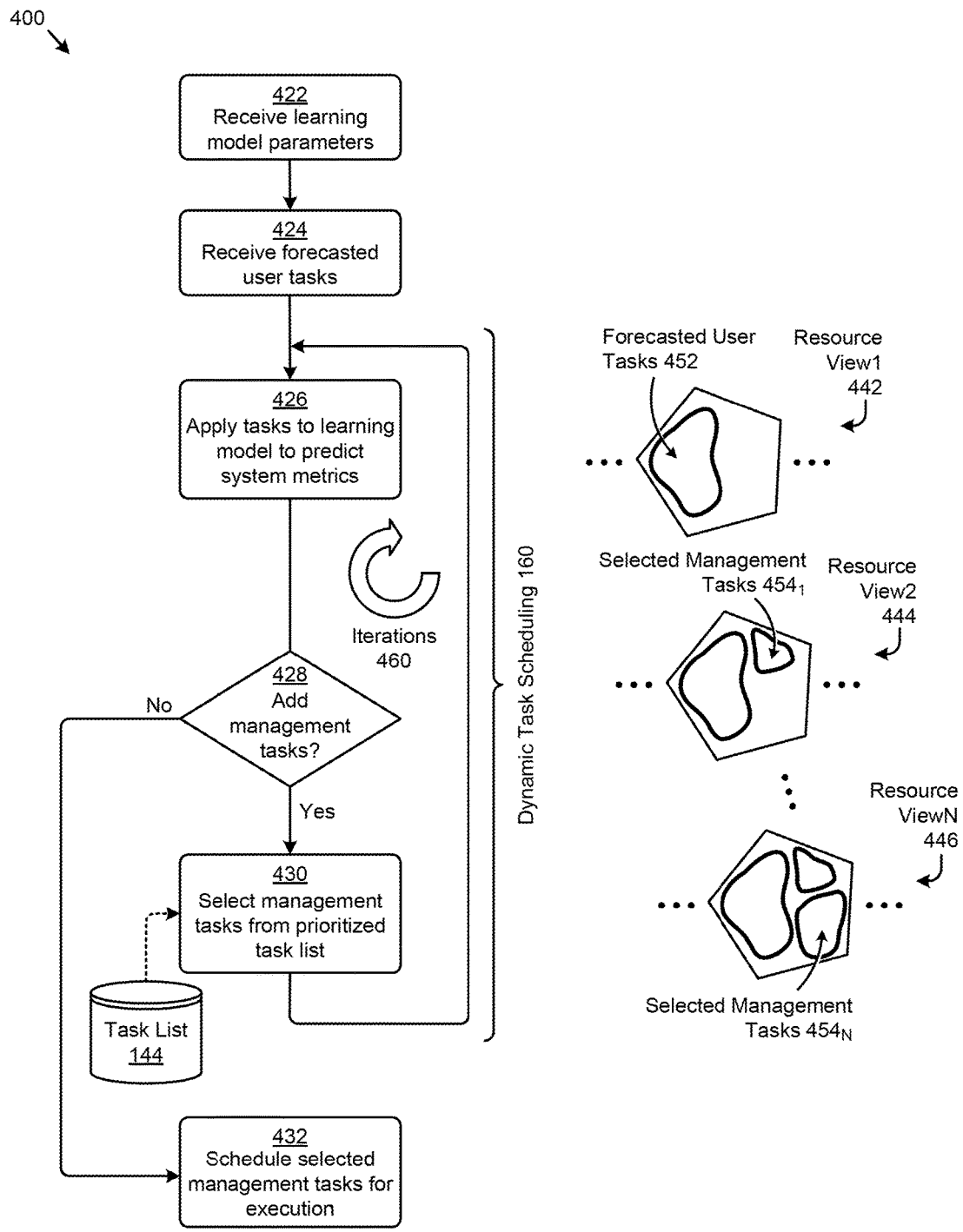
FIG. 4 depicts a dynamic task scheduling technique implemented in systems for dynamic scheduling of distributed storage management tasks using predicted system characteristics, according to some embodiments.

The foregoing parameters generated by the predictive modeling parameter generation technique 3C00 and/or other parameters determined by other herein disclosed techniques can be used to dynamically schedule management tasks, as described in FIG. 4, according to some embodiments.

FIG. 4 depicts a dynamic task scheduling technique 400 implemented in systems for dynamic scheduling of distributed storage management tasks using predicted system characteristics. As an option, one or more variations of dynamic task scheduling technique 400 or any aspect thereof may be implemented in the context of the architecture and functionality of the embodiments described herein. The dynamic task scheduling technique 400 or any aspect thereof may be implemented in any environment.

The dynamic task scheduling technique 400 presents one embodiment of certain steps and/or operations for facilitating dynamic management task scheduling (see dynamic task scheduling 160) according to the herein disclosed techniques. In one or more embodiments, the steps and underlying operations comprising the dynamic task scheduling technique 400 can be executed by an instance of the management task scheduling engine $130_1$ described in FIG. 1A3. As shown, the dynamic task scheduling technique 400 can commence with receiving certain learning model parameters characterizing one or more learning models associating system tasks and system metrics (see operation 422). Forecasted user task parameters characterizing a set of user tasks expected to be executed in a certain forecast period (e.g., 30 days) can be received (see operation 424).

As shown, the set of high order operations corresponding to the dynamic task scheduling 160 can be repeatedly executed in one or more iterations (e.g., iterations 460). In a first iteration through the dynamic task scheduling 160 operations, the forecasted user tasks are applied to the learning model (e.g., described by the learning model parameters) to predict a respective set of system metrics (see operation 426). For example, such a first iteration might be illustrated in a resource view1 442 showing a resource consumption space corresponding to the forecasted user tasks 452. The dynamic task scheduling technique 400 might determine whether any management tasks can be added to a set of selected management tasks (see decision 428). For example, the available resources in the resource view1 442 (e.g., resource space not consumed by the forecasted user tasks 452) might be analyzed to determine whether management tasks can be added. In many cases, the set of selected management tasks might be an empty set on the first iteration. If management tasks have been determined to be added (see "Yes" path of decision 428), one or more management tasks from a prioritized task list (e.g., task list 144) can be selected (see operation 430). The selected management tasks can be combined with any earlier selected management tasks. Such selected management tasks and the forecasted user tasks can then be applied to the learning model to predict a new set of system metrics (see operation 426). As an example, such system metrics can be illustrated in a resource view2 444 showing a resource consumption space corresponding to the forecasted user tasks and the then current set of selected management tasks $454_1$. The operations corresponding to the dynamic task scheduling 160 can continue to select additional management tasks for the subject forecast period. As shown, a resource viewN 446 further includes a resource consumption space corresponding to a second set of selected management tasks $454_N$.

When no further management tasks are to be added (see "No" path of decision 428), the then current set of selected management tasks can be scheduled for execution (see operation 432). For example, the dynamic task scheduling technique 400 might determine that no further management tasks are to be selected since the resource constraints (e.g., CPU capability, storage capacity, etc.) might not allow additional tasks to be run without impacting the system performance. In other cases, the dynamic task scheduling technique 400 might halt the management task selection process after a certain time period.

Specifically, in some cases, a tradeoff might be applied between a management task scheduling optimization (e.g., maximum utilization of available resources) and a time to complete the scheduling task. In such cases, a prioritized task list can serve to reduce the time to determine a dynamic management task schedule according to the herein disclosed techniques. An example of a data structure for such a prioritized task list is shown and described as pertains to FIG. 5.

Figure 5:
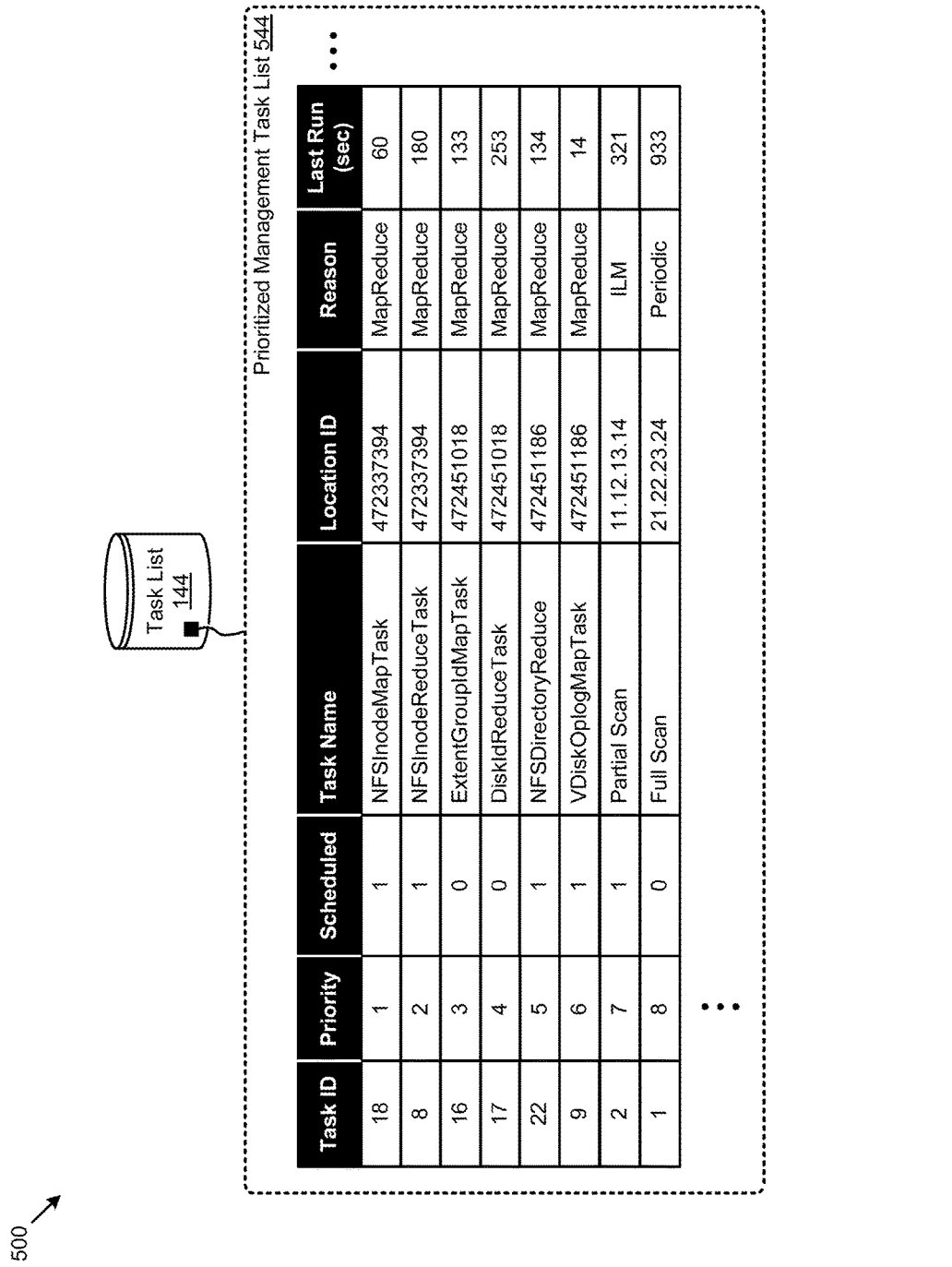
FIG. 5 presents a data structure for codifying a task list used in systems for dynamic scheduling of distributed storage management tasks using predicted system characteristics, according to some embodiments.

FIG. 5 presents a data structure 500 for codifying a task list used in systems for dynamic scheduling of distributed storage management tasks using predicted system characteristics. As an option, one or more variations of data structure 500 or any aspect thereof may be implemented in the context of the architecture and functionality of the embodiments described herein. The data structure 500 or any aspect thereof may be implemented in any environment.

The embodiment shown in FIG. 5 is one example of a data structure that can be used to codify a task list (e.g., distributed storage management tasks) that can be used to dynamically schedule distributed storage management tasks according to the herein disclosed techniques. Specifically, the data structure 500 can comprise the attributes of certain management tasks that can be identified as relevant to a certain distributed storage system and/or portion (e.g., cluster, node, etc.) of a distributed storage system. For example, the identified management tasks described in the data structure 500 might be identified for remediation of certain breaches of performance limits, resource constraints, and/or other thresholds. In some embodiments, the management tasks described by the data structure 500 can be prioritized to further facilitate low latency selection of management tasks for dynamic scheduling.

FIG. 5 specifically depicts a prioritized management task list 544 for storage in the task list 144. As shown, the data structure 500 can have a table structure comprising rows representing various management tasks, and columns representing certain attributes associated with each management task. For example, a given row might correspond to a certain management task identified by a "Task ID" (e.g., 18, 8, 16, etc.) associated with a "Priority" (e.g., 1, 2, 3, etc.), a "Scheduled" status (e.g., 1=scheduled, 0=not scheduled), a "Task Name" (e.g., NfsInodeMapTask, NfsInodeReduceTask, etc.), a "Location ID" (e.g., node 472337394, cluster 11.12.13.14, etc.), a "Reason" (e.g., MapReduce, ILM, etc.), a "Last Run" time (e.g., 60 seconds, 933 seconds, etc.), and/or other attributes. In certain embodiments, the management tasks and/or the priorities described in the prioritized management task list 544 can be dynamically updated as certain system information is received (e.g., system metrics measured at a system monitor). According to the herein disclosed techniques, the resulting updated instance of the prioritized management task list 544 can be traversed by a task selector to discover the highest priority management tasks that have yet to be scheduled. In some cases, prioritization might include heuristics or rules for prioritizing management tasks to be run where the prioritization is based on an inter-relationship between a first management task and a second management task. Further, prioritization based on an inter-relationship between a first management task and a second management task might be based on inter-relationships between a task with a longer measured rune time and a task with a shorter measured run time (e.g., see the "Last Run" column).

Additional Embodiments of the Disclosure

Additional Practical Application Examples

Figure 6:
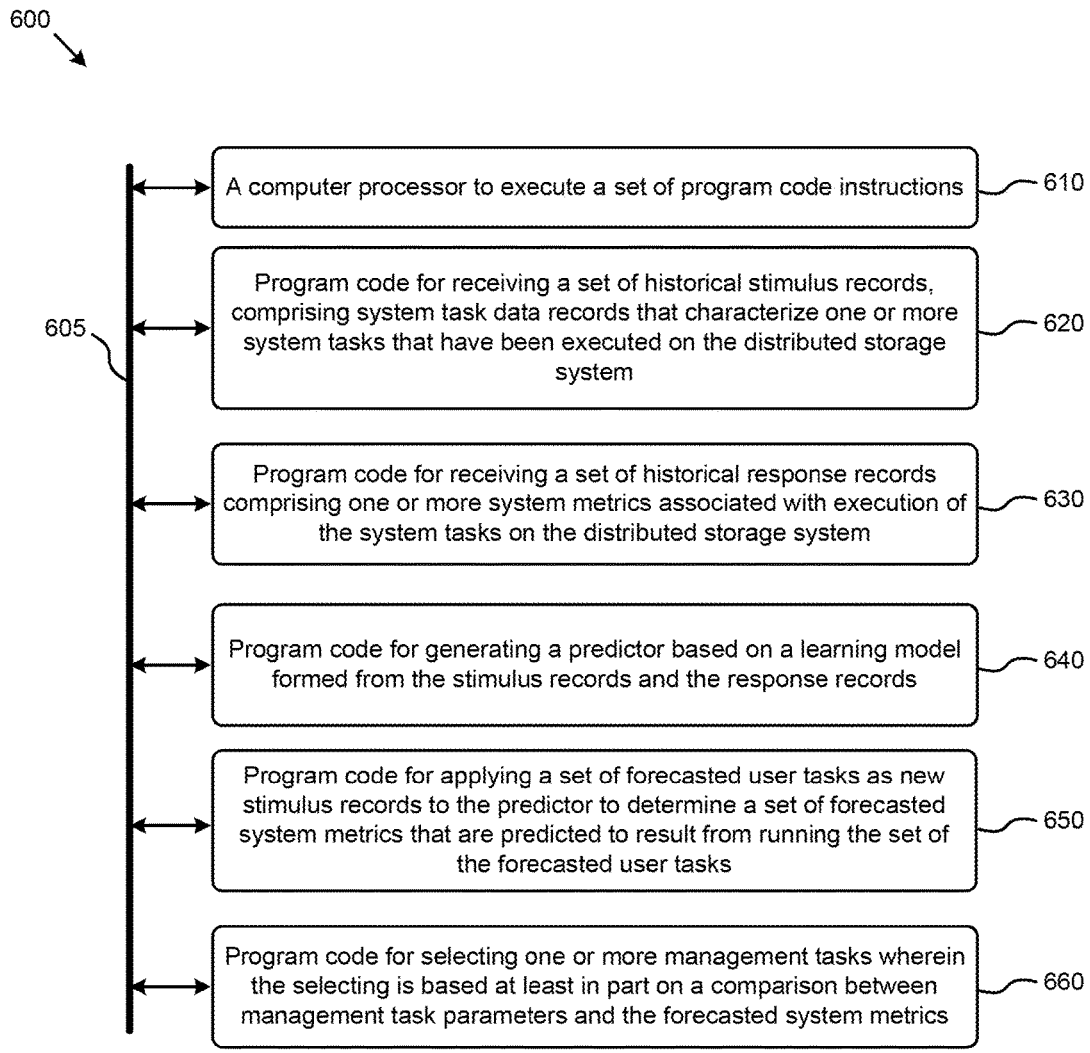
FIG. 6 depicts system components as arrangements of computing modules that are interconnected so as to implement certain of the herein-disclosed embodiments.

FIG. 6 depicts a system 600 as an arrangement of computing modules that are interconnected so as to operate cooperatively to implement certain of the herein-disclosed embodiments. The partitioning of system 600 is merely illustrative and other partitions are possible. As an option, the system 600 may be implemented in the context of the architecture and functionality of the embodiments described herein. Of course, however, the system 600 or any operation therein may be carried out in any desired environment. The system 600 comprises at least one processor and at least one memory, the memory serving to store program instructions corresponding to the operations of the system. As shown, an operation can be implemented in whole or in part using program instructions accessible by a module. The modules are connected to a communication path 605, and any operation can communicate with other operations over communication path 605. The modules of the system can, individually or in combination, perform method operations within system 600. Any operations performed within system 600 may be performed in any order unless as may be specified in the claims. The shown embodiment implements a portion of a computer system, presented as system 600, comprising a computer processor to execute a set of program code instructions (see module 610) and modules for accessing memory to hold program code instructions to perform: receiving a set of historical stimulus records, comprising system task data records that characterize one or more system tasks that have been executed on the distributed storage system (see module 620); receiving, a set of historical response records comprising one or more system metrics associated with execution of the system tasks on the distributed storage system (see module 630). The of historical response records may have been gathered through observations taken in a recent time period or from observations taken in a longer-past time period, or both. Processing continues by generating a predictor based on a learning model formed from the stimulus records and the response records (see module 640); applying a set of forecasted user tasks as new stimulus records to the predictor to determine a set of forecasted system metrics that are predicted to result from running the set of the forecasted user tasks (see module 650). Forecasted system metrics can include any measured characteristics pertaining to any of the aforementioned system tasks and/or any of the aforementioned system metrics (e.g., CPU usage, storage consumption, bandwidth consumption, etc.), or metrics such as CPU headroom, storage runway, and storage IOPS, or any metric than can be quantitatively measured or calculated. As shown, processing includes steps for selecting one or more management tasks wherein the selecting is based at least in part on a comparison between management task parameters and the forecasted system metrics (see module 660).

Variations of the foregoing may include more or fewer of the shown modules and variations may perform more or fewer (or different) steps, and/or may use data elements in more (or fewer), or different operations.

Strictly as examples, some variations include:
Variations where selecting management tasks is based on an inter-relationship between a first management task and a second management task.
Variations where selecting management tasks is based at least in part on a time or nature or extent of the respective management task's release of resources (e.g., between two or more interrelated management tasks).

Variations where the system task data records comprise one or more user task data records.

Variations where the learning model characterizes one or more correlations between at least two of, the user tasks, or the management tasks, or the system metrics.

Variations where the management task parameters are based at least in part on historical data from running management tasks.

Variations further comprising generating a task list based at least in part on the system metrics.

Variations where the selected management tasks are selected from a task list.

Variations where a first set of selected management tasks are prioritized based at least in part on a set of scoring rules.

Variations where a second set of selected management tasks are based at least in part on at least one of the first set of selected management tasks.

Variations where the second set of selected management tasks do not exceed a set of resource constraints.

Variations further comprising determining an execution schedule for at least two of the selected management tasks.

System Architecture Overview

Additional System Architecture Examples

Figure 7A:
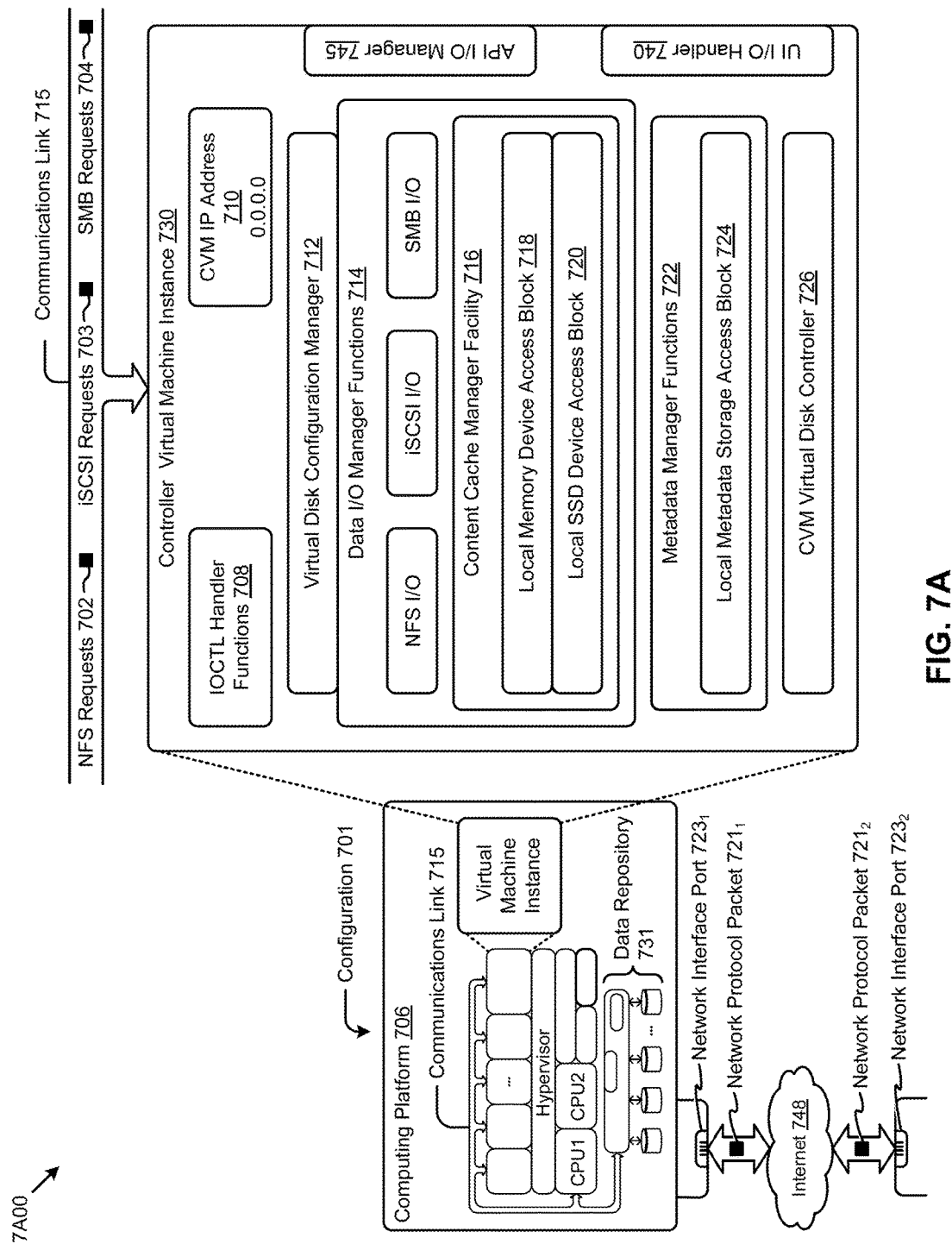
FIG. 7A and FIG. 7B depict architectures comprising collections of interconnected components suitable for implementing embodiments of the present disclosure and/or for use in the herein-described environments.

FIG. 7A depicts a virtual machine architecture 7A00 comprising a collection of interconnected components suitable for implementing embodiments of the present disclosure and/or for use in the herein-described environments. The shown virtual machine architecture 7A00 includes a virtual machine instance in a configuration 701 that is further described as pertaining to the controller virtual machine instance 730. A controller virtual machine instance receives block I/O (input/output or IO) storage requests as network file system (NFS) requests in the form of NFS requests 702, and/or internet small computer storage interface (iSCSI) block IO requests in the form of iSCSI requests 703, and/or Samba file system requests (SMB) in the form of SMB requests 704. The controller virtual machine instance publishes and responds to an internet protocol (IP) address (e.g., see CVM IP address 710). Various forms of input and output (I/O or IO) can be handled by one or more IO control handler functions (see IOCTL functions 708) that interface to other functions such as data IO manager functions 714, and/or metadata manager functions 722. As shown, the data IO manager functions can include communication with a virtual disk configuration manager 712, and/or can include direct or indirect communication with any of various block IO functions (e.g., NFS IO, iSCSI IO, SMB IO, etc.).

In addition to block IO functions, the configuration 701 supports IO of any form (e.g., block IO, streaming IO, packet-based IO, HTTP traffic, etc.) through either or both of a user interface (UI) handler such as UI IO handler 740 and/or through any of a range of application programming interfaces (APIs), possibly through the shown API IO manager 745.

The communications link 715 can be configured to transmit (e.g., send, receive, signal, etc.) any types of communications packets comprising any organization of data items. The data items can comprise a payload data area as well as a destination address (e.g., a destination IP address), a source address (e.g., a source IP address), and can include various packet processing techniques (e.g., tunneling), encodings (e.g., encryption), and/or formatting of bit fields into fixed-length blocks or into variable length fields used to populate the payload. In some cases, packet characteristics include a version identifier, a packet or payload length, a traffic class, a flow label, etc. In some cases the payload comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions a data processor for execution. Such a medium may take many forms including, but not limited to, non-volatile media and volatile media. Non-volatile media includes any non-volatile storage medium, for example, solid state storage devices (SSD), or optical or magnetic disks such as disk drives or tape drives. Volatile media includes dynamic memory such as a random access memory. As shown, the controller virtual machine instance 730 includes a content cache manager facility 716 that accesses storage locations, possibly including local DRAM (e.g., through the local memory device access block 718) and/or possibly including accesses to local solid state storage (e.g., through local SSD device access block 720).

Common forms of computer readable media includes any non-transitory computer readable medium, for example, floppy disk, flexible disk, hard disk, magnetic tape, or any other magnetic medium; CD-ROM or any other optical medium; punch cards, paper tape, or any other physical medium with patterns of holes, or any RAM, PROM, EPROM, FLASH-EPROM, or any other memory chip or cartridge. Any data can be stored, for example, in any form of external data repository 731, which in turn can be formatted into any one or more storage areas, and which can comprise parameterized storage accessible by a key (e.g., a filename, a table name, a block address, an offset address, etc.). An external data repository 731, can store any forms of data, and may comprise a storage area dedicated to storage of metadata pertaining to the stored forms of data. In some cases, metadata, can be divided into portions. Such portions and/or cache copies can be stored in the external storage data repository and/or in a local storage area (e.g., in local DRAM areas and/or in local SSD areas). Such local storage can be accessed using functions provided by a local metadata storage access block 724. The external data repository 731, can be configured using a CVM virtual disk controller 726, which can in turn manage any number or any configuration of virtual disks.

Execution of the sequences of instructions to practice certain embodiments of the disclosure are performed by a one or more instances of a processing element such as a data processor, or such as a central processing unit (e.g., CPU1, CPU2). According to certain embodiments of the disclosure, two or more instances of configuration 701 can be coupled by a communications link 715 (e.g., backplane, LAN, PTSN, wired or wireless network, etc.) and each instance may perform respective portions of sequences of instructions as may be required to practice embodiments of the disclosure The shown computing platform 706 is interconnected to the Internet 748 through one or more network interface ports (e.g., network interface port 723$_1$ and network interface port 723$_2$). The configuration 701 can be addressed through one or more network interface ports using an IP address. Any operational element within computing platform 706 can perform sending and receiving operations using any of a range of network protocols, possibly including network protocols that send and receive packets (e.g., see network protocol packet 721$_1$ and network protocol packet 721$_2$).

The computing platform 706 may transmit and receive messages that can be composed of configuration data, and/or any other forms of data and/or instructions organized into a data structure (e.g., communications packets). In some cases, the data structure includes program code instructions (e.g., application code), communicated through Internet 748 and/or through any one or more instances of communications link 715. Received program code may be processed and/or executed by a CPU as it is received and/or program code may be stored in any volatile or non-volatile storage for later execution. Program code can be transmitted via an upload (e.g., an upload from an access device over the Internet 748 to computing platform 706). Further, program code and/or results of executing program code can be delivered to a particular user via a download (e.g., a download from the computing platform 706 over the Internet 748 to an access device).

The configuration 701 is merely one sample configuration. Other configurations or partitions can include further data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a data processor. Some embodiments include one or more special-purpose hardware components (e.g., power control, logic, sensors, transducers, etc.). A module may include one or more state machines and/or combinational logic used to implement or facilitate the operational and/or performance characteristics pertaining to dynamic scheduling of distributed storage management tasks using predicted system characteristics.

Various implementations of the data repository comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of dynamic scheduling of distributed storage management tasks using predicted system characteristics). Such files or records can be brought into and/or stored in volatile or non-volatile memory.

Figure 7B:
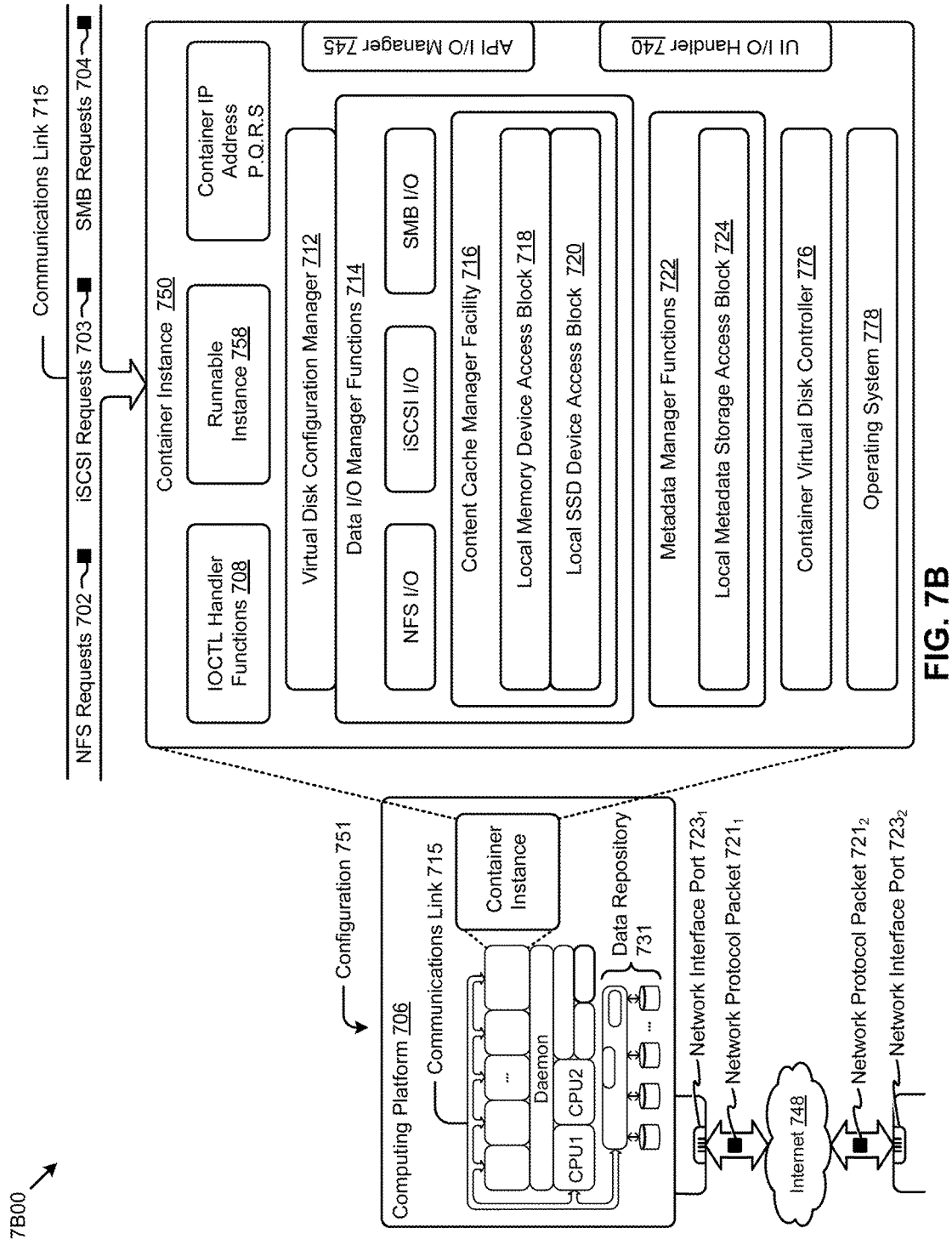

FIG. 7B depicts a containerized architecture 7B00 comprising a collection of interconnected components suitable for implementing embodiments of the present disclosure and/or for use in the herein-described environments. The shown containerized architecture 7B00 includes a container instance in a configuration 751 that is further described as pertaining to the container instance 750. The configuration 751 includes a daemon (as shown) that performs addressing functions such as providing access to external requestors via IP address (e.g., "P.Q.R.S", as shown), a protocol specification (e.g., "http:") and possibly port specifications. The daemon can perform port forwarding to the container. A container can be rooted in a directory system, and can be accessed by file system commands (e.g., "ls" or "ls-a", etc.). The container might optionally include an operating system 778, however such an operating system need not be provided. Instead, a container can include a runnable instance 758, which is built (e.g., through compilation and linking, or just-in-time compilation, etc.) to include all of the library and OS-like functions needed for execution of the runnable instance. In some cases, a runnable instance can be built with a virtual disk configuration manager, any of a variety of data IO management functions, etc. In some cases, a runnable instance includes code for, and access to a container virtual disk controller 776. Such a container virtual disk controller can perform any of the functions that the aforementioned CVM virtual disk controller 726, yet such a container virtual disk controller does not rely on a hypervisor or any particular operating system so as to perform its range of functions.

In the foregoing specification, the disclosure has been described with reference to specific embodiments thereof. It will however be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A method for scheduling storage management tasks over predicted user tasks in a distributed storage system, the method comprising:

receiving a set of historical stimulus records, comprising system task data records that characterize one or more system tasks that have been executed on the distributed storage system that comprises at least a first node and a second node, wherein the distributed storage system comprising a plurality of storage devices of a cluster, wherein any node distributed across the cluster of nodes that has a controller virtual machine utilizes its respective controller virtual machine to read and write to content on the plurality of storage devices in a storage pool;

receiving, a set of historical response records comprising one or more system metrics associated with execution of the system tasks on the first node of the distributed storage system of the cluster, wherein a user task executed at the first node is observable at different nodes within the cluster, the one or more system metrics comprising a first portion that corresponds to measured metrics at the first node and a second portion that corresponds to results measured at a second node that are produced by executing the user task on the first node:

generating a prediction model for the distributed storage system of the cluster based on a learning model formed from at least two stimulus records of the set of historical stimulus records and at least two response records of the set of historical response records; generating a set of forecasted user tasks predicted to be executed on the distributed storage system of cluster;

applying the set of forecasted user tasks as new stimulus records to the prediction model to determine a set of forecasted system metrics for the distributed storage system of cluster, the set of forecasted system metrics being predicted to result from running the set of forecasted user tasks on the distributed storage system of cluster the distributed storage system of cluster; and selecting one or more distributed storage management tasks to be scheduled for execution on certain nodes of the distributed storage system of cluster based at least in part on a comparison between management task parameters and the set of forecasted system metrics, wherein the certain nodes of the distributed storage system are identified as being relevant to the one or more distributed storage management tasks.

2. The method of claim 1, wherein selecting the one or more management tasks is based at least in part on an inter-relationship between a first one of the one or more management tasks and a second one of the one or more management tasks.

3. The method of claim 2, wherein selecting the one or more management tasks is based at least in part on a time of release of resources.

4. The method of claim 1, wherein the learning model characterizes one or more correlations between at least two user tasks, management tasks, or system metrics.

5. The method of claim 1, wherein the management task parameters are based at least in part on historical data from running management tasks.

6. The method of claim 1, further comprising generating a task list based at least in part on the system metrics.

7. The method of claim 6, wherein the one or more management tasks are selected from the task list.

8. The method of claim 6, wherein a first set of the one or more management tasks are prioritized based at least in part on a set of scoring rules.

9. The method of claim 8, wherein the first set of the one or more management tasks do not exceed a set of resource constraints, the set of historical stimulus records comprise time-sequenced stimulus records, and the set of historical response records comprise time-sequenced response records.

10. The method of claim 6, further comprising determining an execution schedule for at least two of the one or more management tasks.

11. A computer readable medium, embodied in a non-transitory computer readable medium, the non-transitory computer readable medium having stored thereon a sequence of instructions which, when stored in memory and executed by a processor causes the processor to perform a set of acts for scheduling storage management tasks over predicted user tasks in a distributed storage system, the set of acts comprising:

receiving a set of historical stimulus records, comprising system task data records that characterize one or more system tasks that have been executed on the distributed storage system that comprises at least a first node and a second node, wherein the distributed storage system comprising a plurality of storage devices of a duster, wherein any node distributed across the cluster of nodes that has a controller virtual machine utilizes its respective controller virtual machine to read and write to content on the plurality of storage devices in a storage pool;

receiving, a set of historical response records comprising one or more system metrics associated with execution of the system tasks on the first node of the distributed storage system of the cluster, wherein a user task executed at the first node is observable at different nodes within the cluster, the one or more system metrics comprising a first portion that corresponds to measured metrics at the first node and a second portion that corresponds to results measured at a second node that are produced by executing the user task on the first node; generating a prediction model for the distributed storage system of the cluster based on a learning model formed from at least two stimulus records of the set of historical stimulus records and at least two response records of the set of historical response records;

generating a set of forecasted user tasks predicted to be executed on the distributed storage system of cluster;

applying the set of forecasted user tasks as new stimulus records to the prediction model to determine a set of forecasted system metrics for the distributed storage system of cluster, the set of forecasted system metrics being predicted to result from running the set of forecasted user tasks on the distributed storage system of cluster the distributed storage system of cluster; and selecting one or more distributed storage management tasks to be scheduled for execution on certain nodes of the distributed storage system of cluster based at least in part on a comparison between management task parameters and the set of forecasted system metrics, wherein the certain nodes of the distributed storage system are identified as being relevant to the one or more distributed storage management tasks.

12. The computer readable medium of claim 11, wherein selecting the one or more management tasks is based at least in part on an inter-relationship between a first one of the one or more management tasks and a second one of the one or more management tasks.

13. The computer readable medium of claim 12, wherein selecting the one or more management tasks is based at least in part on a time of release of resources.

14. The computer readable medium of claim 11, wherein the learning model characterizes one or more correlations between at least two user tasks, management tasks, or system metrics.

15. The computer readable medium of claim 11, wherein the management task parameters are based at least in part on historical data from running management tasks.

16. The computer readable medium of claim 11, wherein the set of acts further comprise generating a task list based at least in part on the system metrics.

17. The computer readable medium of claim 16, wherein the one or more management tasks are selected from the task list.

18. A system for scheduling storage management tasks over predicted user tasks in a distributed storage system comprising: a storage medium having stored thereon a sequence of instructions; and a processor or processors that execute the sequence of instructions to cause the processor or processors to perform a set of acts, the set of acts comprising:

receiving a set of historical stimulus records, comprising system task data records that characterize one or more system tasks that have been executed on the distributed storage system that comprises at least a first node and a second node, wherein the distributed storage system comprising a plurality of storage devices of a cluster, wherein any node distributed across the cluster of nodes that has a controller virtual machine utilizes its respective controller virtual machine to read and write to content on the plurality of storage devices in a storage pool;

receiving, a set of historical response records comprising one or more system metrics associated with execution of the system tasks on the first node of the distributed storage system of the cluster, wherein a user task executed at the first node is observable at different nodes within the cluster, the one or more system metrics comprising a first portion that corresponds to measured metrics at the first node and a second portion that corresponds to results measured at a second node that are produced by executing the user task on the first node;

generating a prediction model for the distributed storage system of the cluster based on a learning model formed from at least two stimulus records of the set of historical stimulus records and at least two response records of the set of historical response records; generating a set of forecasted user tasks predicted to be executed on the distributed storage system of cluster;

applying the set of forecasted user tasks as new stimulus records to the prediction model to determine a set of forecasted system metrics for the distributed storage system of cluster, the set of forecasted system metrics being predicted to result from running the set of forecasted user tasks on the distributed storage system of cluster the distributed storage system of cluster; and selecting one or more distributed storage management tasks to be scheduled for execution on certain nodes of the distributed storage system of duster based at least in part on a comparison between management task parameters and the set of forecasted system metrics, wherein the certain nodes of the distributed storage system are identified as being relevant to the one or more distributed storage management tasks.

19. The system of claim 18, wherein selecting the one or more management tasks is based at least in part on an inter-relationship between a first one of the one or more management tasks and a second one of the one or more management tasks.

20. The system of claim 19, wherein selecting the one or more management tasks is based at least in part on a time of release of resources.

* * * * *